US 7,275,210 B2

(12) United States Patent
Girgensohn

(10) Patent No.: US 7,275,210 B2
(45) Date of Patent: Sep. 25, 2007

(54) SYSTEMS AND METHODS FOR GENERATING VIDEO SUMMARY IMAGE LAYOUTS

(75) Inventor: Andreas Girgensohn, Menlo Park, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 976 days.

(21) Appl. No.: 10/392,822

(22) Filed: Mar. 21, 2003

(65) Prior Publication Data
US 2004/0187078 A1 Sep. 23, 2004

(51) Int. Cl.
*G06F 15/00* (2006.01)
(52) U.S. Cl. .................................... 715/517
(58) Field of Classification Search ................ 715/517, 715/520, 500.1; 345/619
See application file for complete search history.

(56) References Cited

U.S. PATENT DOCUMENTS

| | | | |
|---|---|---|---|
| 5,708,767 A | | 1/1998 | Yeo et al. |
| 5,956,738 A | * | 9/1999 | Shirakawa ................... 715/517 |
| 6,134,565 A | * | 10/2000 | Hommersom et al. ...... 715/517 |
| 6,144,974 A | * | 11/2000 | Gartland ..................... 715/517 |
| 6,172,675 B1 | * | 1/2001 | Ahmad et al. ........... 715/500.1 |
| 6,288,719 B1 | * | 9/2001 | Squilla et al. .............. 715/805 |
| 6,289,361 B1 | * | 9/2001 | Uchida ..................... 715/501.1 |
| 6,326,970 B1 | * | 12/2001 | Mott et al. .................. 345/667 |
| 6,535,639 B1 | | 3/2003 | Uchihachi et al. |
| 6,596,032 B2 | * | 7/2003 | Nojima et al. .............. 715/517 |
| 6,636,648 B2 | * | 10/2003 | Loui et al. .................. 382/284 |
| 6,727,909 B1 | * | 4/2004 | Matsumura et al. ........ 345/629 |
| 7,188,310 B2 | * | 3/2007 | Schwartzkopf ............. 715/517 |
| 2002/0103821 A1 | * | 8/2002 | Nikolovska et al. ..... 707/500.1 |
| 2002/0144055 A1 | * | 10/2002 | Nitta et al. ................. 711/108 |
| 2002/0144226 A1 | * | 10/2002 | Nitta et al. .................. 716/11 |
| 2003/0093759 A1 | * | 5/2003 | Narusawa .................... 715/517 |
| 2003/0163786 A1 | * | 8/2003 | Shields ....................... 715/517 |
| 2004/0125877 A1 | * | 7/2004 | Chang et al. .......... 375/240.28 |
| 2004/0148573 A1 | * | 7/2004 | Buice et al. ................ 715/517 |
| 2004/0174563 A1 | * | 9/2004 | Cassidy et al. ............ 358/1.18 |
| 2004/0221322 A1 | * | 11/2004 | Shen et al. ................. 725/135 |
| 2005/0220366 A1 | * | 10/2005 | Watanabe et al. ........... 382/305 |
| 2006/0103891 A1 | * | 5/2006 | Atkins ........................ 358/450 |

OTHER PUBLICATIONS

Boreczky et al., An Interactive Comic Book Presentation for Exploring Video, ACM 2000, pp. 185-192.*
Girgensohn et al., A Semi-automatic Approach to Home Video Editing, ACM 2000, pp. 81-89.*

(Continued)

*Primary Examiner*—Cong-Lac Huynh
(74) *Attorney, Agent, or Firm*—Sughrue Mion, PLLC; Joseph Bach

(57) ABSTRACT

Systems and methods for creating aesthetically pleasing visual image summaries from a collection of input images. The systems and methods determine a visual image summary by creating candidate partial layouts, assigning penalty scores to the candidate partial layouts based on a number of evaluation criteria, evaluating the penalty scores for the candidate partial layouts, and building upon the candidate partial layouts, beginning with the lowest scoring candidate partial layout first, to form complete layouts. The resultant visual image summary fits within a user defined area, maintains the order of the input images, and contains a relative small amount of aesthetically undesirable qualities.

39 Claims, 24 Drawing Sheets

OTHER PUBLICATIONS

Uchihashi et al., Video Manga: Generating Semantically Meaningful Video Summaries, ACM 1999, pp. 383-392.*

Shipman et al., Generation of Interactive Multi-Level Video Summaries, ACM 2003, pp. 392-401.*

Michael K. Coleman and D. Stott Parker, Aesthetics-based Graph Layout for Human Consumption, Software—Practice and Experience, vol. 26(12), pp. 1415-1438 (Dec. 1996).

Benjamin B. Bederson, Quantum Treemaps and Bubblemaps for a Zoomable Image Browser, HCIL Tech Report #2001-10, University of Maryland, College Park, 2001. ftp://ftp.cs.umd.edu/pub/hcil/Reports—Abstracts-Bioliography/2001-10htm 1/2001-10.pdf.

K. A. Dowsland, W. B. Dowsland, Packing Problems, European Journal of Operational Research, vol. 56, pp. 2-14, 1992.

J. Fogarty, J. Forlizzi, S. E. Hudson, Aesthetic Information Collages: Generating Decorative Displays that Contain Information. UIST 01, pp. 141-150, 2001.

Y. Taniguchi, A. Akutsu, Y. Tonomura, PanoramaExcerpts: Extracting and Packing Panoramas for Video Browsing. Proce ACM Multimedia 97, pp. 427-436, 1997.

B.-L. Yeo, M. M. Yeung, Classification, Simplification and Dynamic Visualization of Scene Transition Graphs for Video Browsing. Proc. IS&T/SPIE Electronic Imaging 98: Storage and Retrieval for Image and Video Database VI, 1998.

M. M. Yeung, B.-L. Yeo, Video Visualization of Compact Presentation and Fast Browsing of Pictorial Content. IEEE Transactions on Circuits and Systems for Video Technology, vol. 7(5), pp. 771-785, 1997.

Michael K. Coleman and D. Stott Parker, Aethestics-based Graph Layout for Human Consumption, Software—Practice and Experience, vol. 26(1), pp. 1-25 (Jan. 1996).

* cited by examiner

Related Art

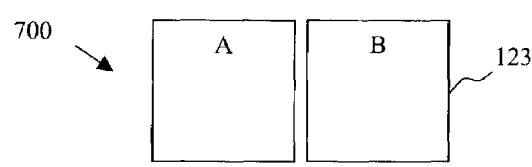
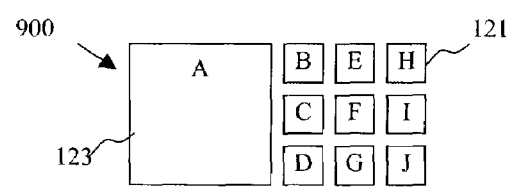
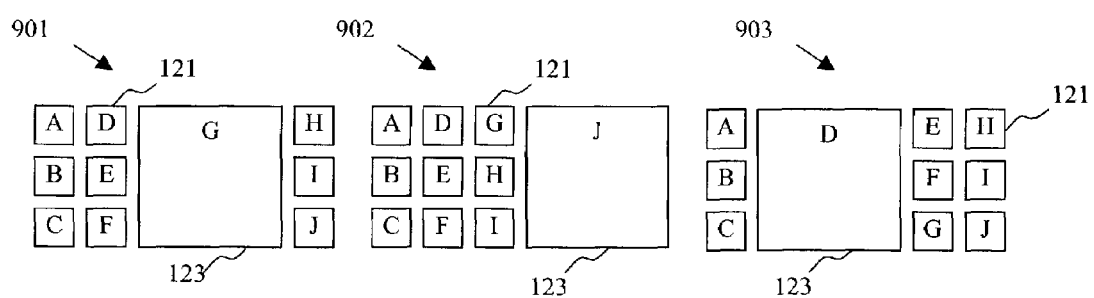

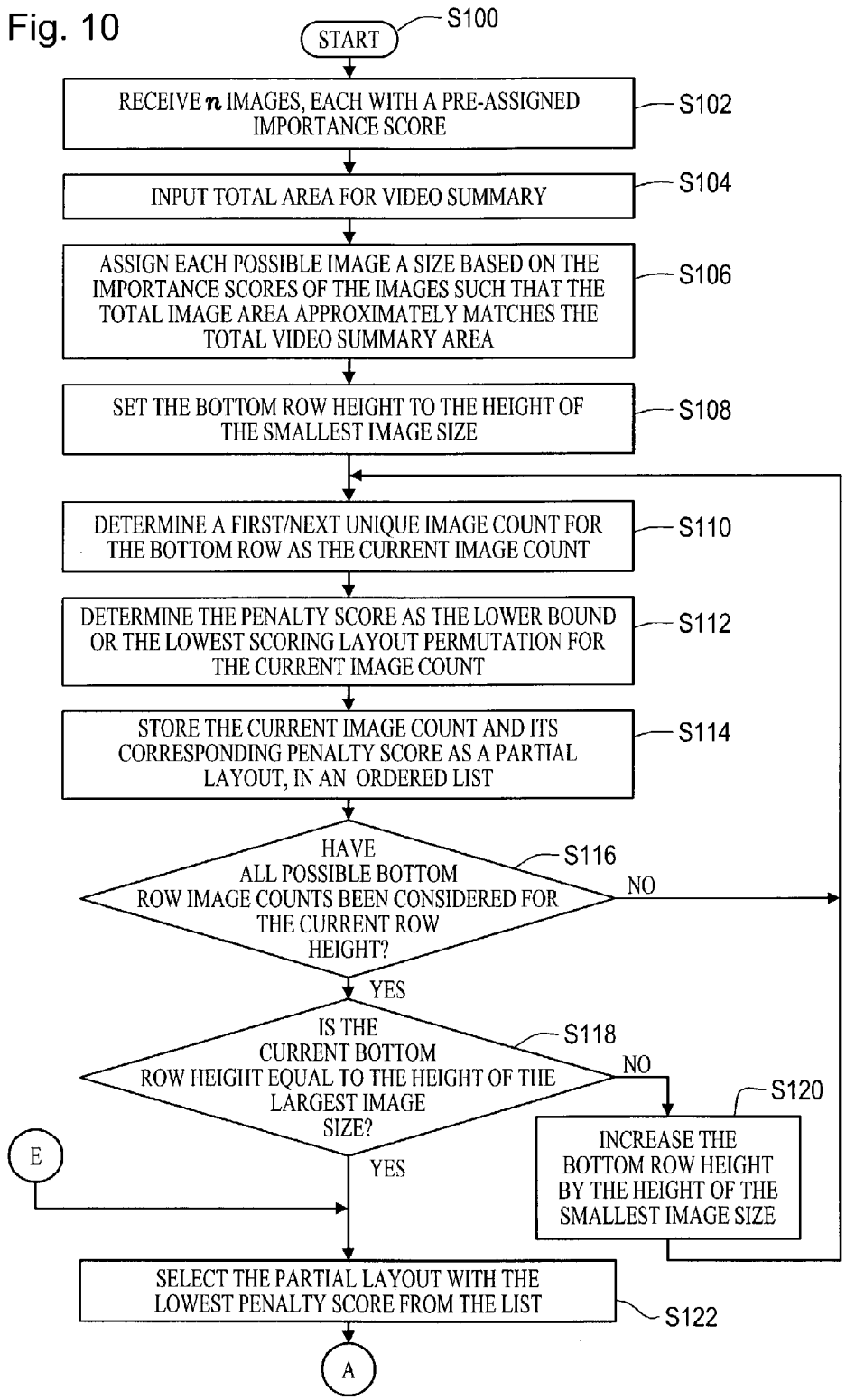

SYSTEMS AND METHODS FOR GENERATING VIDEO SUMMARY IMAGE LAYOUTS

BACKGROUND OF THE INVENTION

1. Field of Invention

The invention relates to methods and systems for creating aesthetically pleasing visual image summaries from a collection of images.

2. Description of Related Art

The Manga technique creates visual video summaries by segmenting a video, determining an importance score for each segment, and selecting a keyframe for each sufficiently important segment of the video. The keyframes are assigned one of three sizes corresponding to the importance of the represented segment. The Magna technique, considering each row independently of the other rows, places the keyframes into rows of different heights where the possible row heights correspond to the possible keyframe sizes. Rows are completely filled by changing the keyframe sizes. The Manga technique determines a layout for each row so that the sizes of as few image as possible are changed.

There are many cases in which the summaries that result from the Manga technique are not as visually pleasing as desired. The Manga technique has a tendency to use many images of the same size rather than produce a combination of varying size. Furthermore, the Magna technique is unable to exactly fill a requested area. While the width of a layout determined according to the Magna technique may be specified, the height of the layout is dependent on the characteristics of the summarized video. Finally, the Magna technique uses only three different input sizes and frequently must resize an image by two sizes to make the image fit into the layout.

SUMMARY OF THE INVENTION

The various exemplary embodiments of the systems and methods according to this invention create visual summaries that address the shortcomings of the original Magna technique. Various exemplary embodiments of the systems and methods according to this invention create image layouts that fit into the requested area, have fewer rows that contain images of only one size, create image layouts with less empty space in the bottom row, and/or use more that three different images sizes. In various exemplary embodiments, the systems and methods according to this invention combine a number of evaluation criteria for the informational quality and for the aesthetic quality of a summary image layout, such as the number of resized images, the proportion of rows filled with images of the same size adjacent to one another, and/or the amount of empty space in the bottom row.

Various exemplary embodiments of the systems and methods according to this invention input a number of images, each with a preassigned relative size that correlates to the importance of that image, and the final size of the layout summary. Then, in various exemplary embodiments, the systems and methods according to this invention analyze various partial layouts beginning with partial layouts of the bottom row, and assign a penalty score to each partial layout. In various exemplary embodiments, the penalty score is determined by comparing the partial layout with the preferred qualities of the layout and/or the preassigned sizes of the input images. The various exemplary embodiments of the systems and methods according to this invention, then build on the partial layout with the lowest penalty score to arrive at an initial final layout. The penalty scores of the remaining partial layouts are compared with the current final layout and any partial layouts whose score exceeds that of the current final layout are discarded. Each remaining partial layout is built upon, row by row, until it either replaces the current final layout or is discarded as having a higher penalty score.

Various exemplary embodiments of the systems and methods according to this invention are able to arrive at a final layout with at least a relatively lowest penalty score, and therefore relatively more desirable qualities, sufficiently fast enough to allow the final layout to be used in a variety of interactive applications.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 7 shows the only permutation for a layout when a row contains only two large images, i.e., for a row that has an image count of "0,0,2";

FIG. 9 shows the four different layout permutations that would result when a row contains nine small images and one large image, i.e., for a row that has an image count of "9,0,1";

FIGS. 10-13 are a flowchart outlining a first exemplary embodiment of a method for determining a final layout according to this invention;

DETAILED DESCRIPTION OF EXEMPLARY EMBODIMENTS

Figure 1:
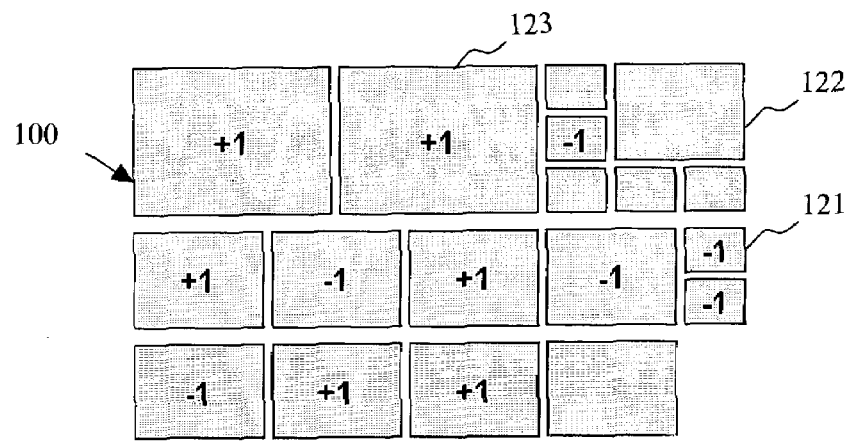
FIG. 1 shows a representative layout for a 9×7 image summary generated using the Manga technique.

FIG. 1 shows a representative layout 100 for a 9×7 image summary generated using the original Manga technique. The original Manga technique creates a layout based on input images of up to three different sizes, where each size is representative of the relative importance of the image. The original Manga technique places the images, maintaining the original order of the images, into rows of different heights, where the height of each row is determined by the largest image in that row. The original Manga technique determines a row layout by assigning a penalty score to both each resized image and to any empty space in the bottom row. An image is resized if it is changed from its initial size, as determined by the relative significance of the image, either by increasing or decreasing the size of that image. In the original Manga technique, resizing an image, either up or down two sizes, costs more penalty points than resizing an image one size up or down.

In the original Manga technique, the representative layout 100 is selected from layouts produced using randomly generated input image sizes. The selected representative layout 100 represents an average result with respect to resized images, the proportion each of row filled with images of the same size, and the height of the original layout.

The representative layout 100 includes a number of large images 123, a number of medium images 122, and a number of small images 121, with the size of an image indicative of the importance of that image relative to the other images. It should be appreciated that the sizes 121, 122, and 123 are defined relative to one another and do not represent specific dimensions. In the exemplary embodiment shown in FIG. 1, a number is located within each image resized by the original Manga technique. Each number represents how the corresponding image has been resized relative to the original size of that image. A "+1" indicates that the image is increased in size by one size relative to the size of that image when the image was input. A "−1" indicates that the image is decreased in size by one size relative to the size of that image when the image was input. In FIG. 1, none of the images were resized by two image sizes, i.e., from the largest image size 123 to the smallest image size 121, or vise versa. Furthermore, the "+1" and "−1" are only representative of how many sizes, up or down respectively, the image has been resized and are not indicative of the penalty score associated with the representative layout 100.

Figure 2:
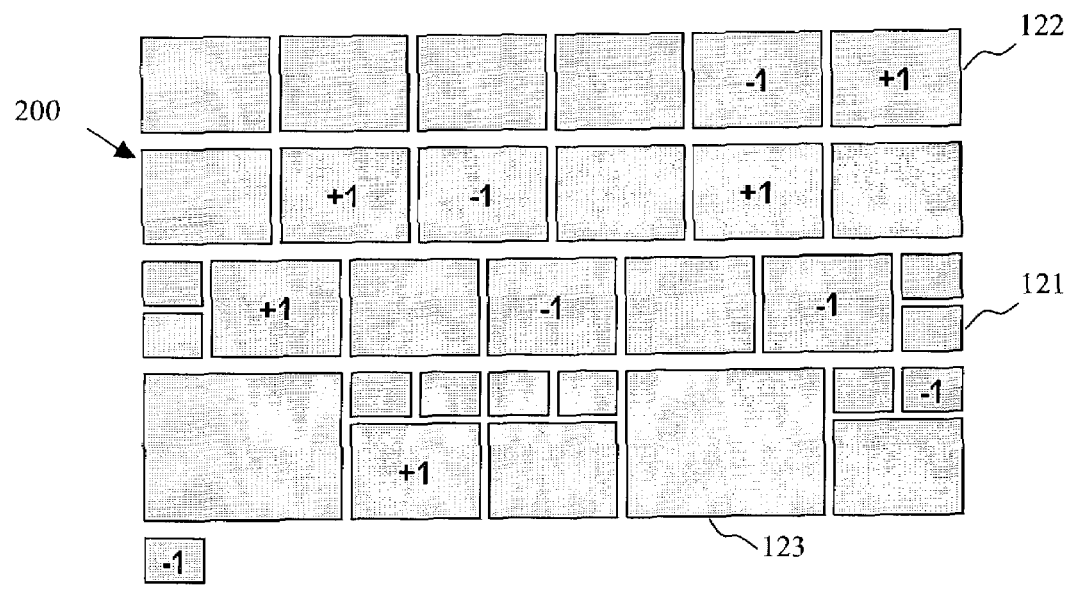
FIG. 2 shows a representative layout for a 10×12 image summary generated using the Magna technique.

FIG. 2 shows a representative layout 200 for a 10×12 image summary generated using the original Manga technique. The representative layout 200 includes large images 123, medium images 122, and small images 121, with the size of an image again indicative of the importance of that image relative to the importance of the other images. It should again be appreciated that the sizes 121, 122, and 123 are defined relative to one another and do not represent specific dimensions. Any resizing of the images is indicated by the number in the center of each image. A "+1" indicates an image that is increased one size relative to the size of that image when the image was input, while a "−1" indicates an image that is decreased one size relative to the size of that image when the image was input. It should be appreciated that the original Manga technique is capable of resizing images two sizes. However, doing so would result in a comparatively higher penalty score. While the resized images in layouts 100 and 200 are each only resized up or down by one size, it is not uncommon to encounter an image resized two sizes in a representative layout generated by the Manga technique.

Figure 3:
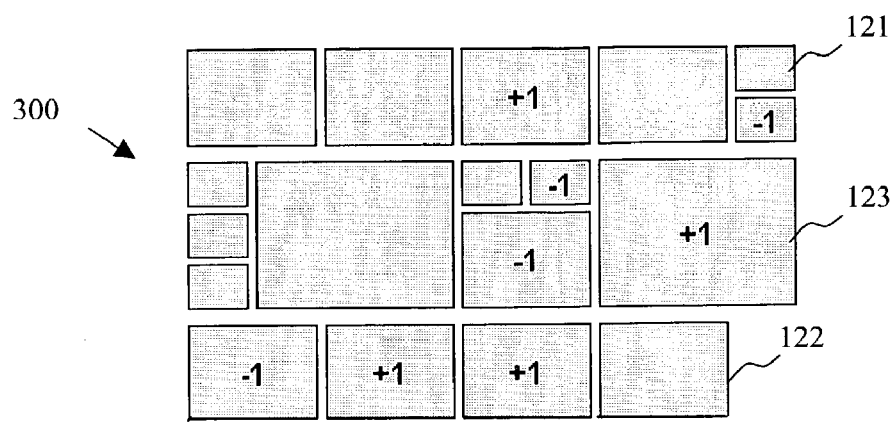
FIG. 3 shows a representative layout for a 9×7 image summary generated by using various exemplary embodiments of the image layout systems and methods according to this invention, where three image sizes are input.

FIG. 3 shows a representative layout 300 for a 9×7 image summary generated using various exemplary embodiments of the image layout systems and methods according to this invention, where three input image sizes are used. The representative layout 300 includes large images 123, medium images 122, and small images 121, with the size an image indicative of the importance of that image relative to the importance of the other images. It should again be appreciated that the sizes 121, 122, and 123 are defined relative to one another and do not represent specific dimensions. Again, each resized image includes a number representing how that image has been resized. A "+1" indicates that the image is been increased in size by one size relative to the size of that image when the image was input. A "−1" indicates that the image is decreased in size by one size relative to the size of that image when the image was input. Notice that while an equal amount of space remains in the bottom row in both the representative layout 300 and the representative layout 100, representative layout 300 contains less resized images and a smaller proportion of rows filled with the same image size adjacent to one another.

Figure 4:
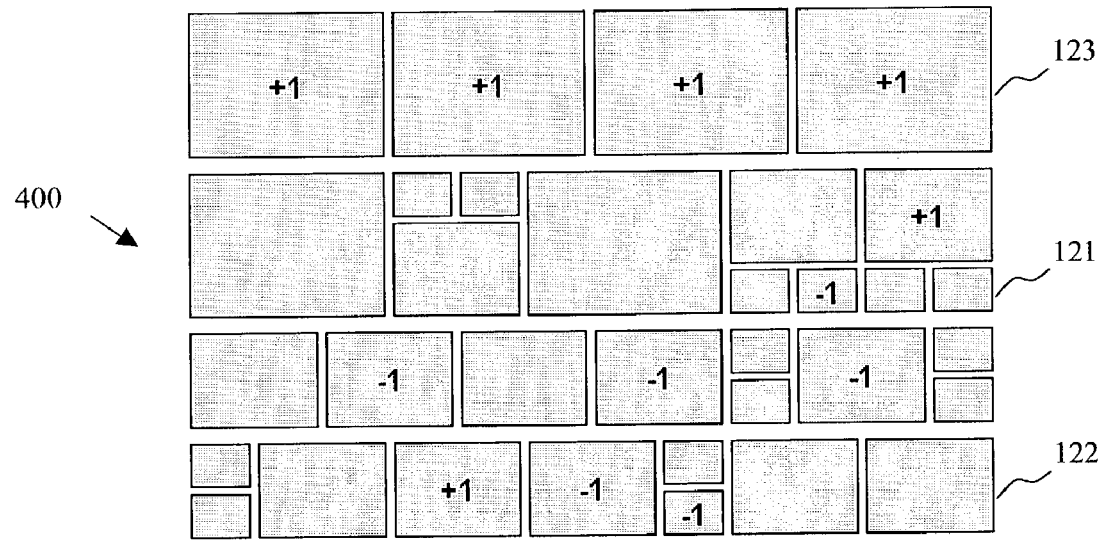
FIG. 4 shows a representative layout for a 10×12 image summary generated by using various exemplary embodiments of the image layout systems and methods according to this invention, where three image sizes are input.

FIG. 4 shows a representative layout 400 for a 10×12 image summary generated using various exemplary embodiments of the image layout systems and methods according to this invention, where three input image sizes are used. The representative layout 400 includes large images 123, medium images 122, and small images 121, with the size of an image indicative of the importance of that image relative to the importance of the other images. It should once again be appreciated that the sizes 121, 122, and 123 are defined relative to one another and do not represent specific dimensions. Once again, each resized image includes a number representing how that image has been resized. A "+1" indicates that the image is increased in size by one size relative to the size of that image when the image was input, while a "−1" indicates that the image is decreased in size by one size relative to the size of that image when the image was input.

When the representative layout 400 is compared with the representative layout 200 it is apparent that a total of 12 images are resized in the representative layout 400, while a total of only 11 images are resized in the representative layout 200. The representative layout 400, however, has no empty space in the bottom row, compared with the relatively large space in layout 200, and a smaller proportion of rows filled with images of the same size adjacent to one another. This is because, according to various exemplary embodiments of the systems and methods according to this invention, it has been determined that a bottom row without any empty space and a smaller proportion of rows filled with the same image size adjacent to one another is more desirable, aesthetically, than a layout that has less resized images but empty space in the bottom row. Therefore, when it is determined that a full bottom row is a more desirable quality of a final layout than a layout that has fewer resized images, the penalty score values for those qualities can be adjusted accordingly. As a consequence, a layout that has more resized images than it might otherwise have, were the bottom row only partially full, may result.

Figure 5:
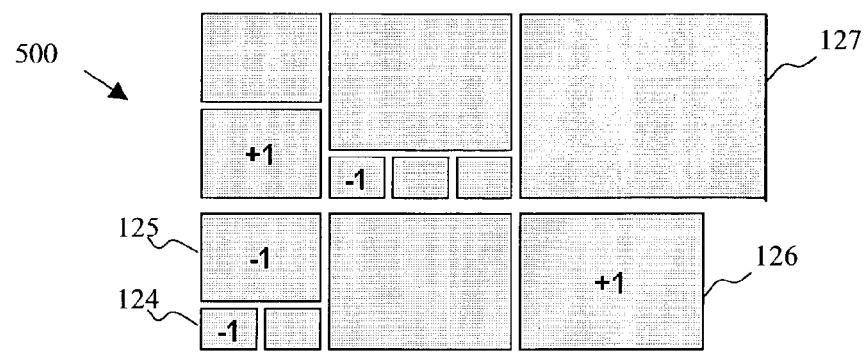
FIG. 5 shows a representative layout for a 9×7 image summary generated by using various exemplary embodiments of the image layout systems and methods according to this invention, where four image sizes are input.

FIG. 5 shows a representative layout 500 for a 9×7 image summary generated by using various exemplary embodiments of the image layout systems and methods according to this invention, where four input image sizes are used. The representative layout 500 includes images of the sizes 124, 125, 126, and 127, that are indicative of an importance of the image relative to the importance of the other images. In particular, in the exemplary embodiment shown in FIG. 5, the image size 124 is the smallest and least important image size. The image size 125 is the next largest and third most important image size. The image size 126 is the next largest and second most important image size, and the image size 127 is the largest and most important image size. It should be appreciated that the sizes 124, 125, 126, and 127 are defined relative to one another and do not represent specific dimensions. Again, each resized image includes a number representing how that image has been resized. A "+1" indicates that the image is increased in size by one size relative to the size of that image when the image was input, and a "−1" indicates that the image is decreased in size by one size relative to the size of that image when the image was input.

Figure 6:
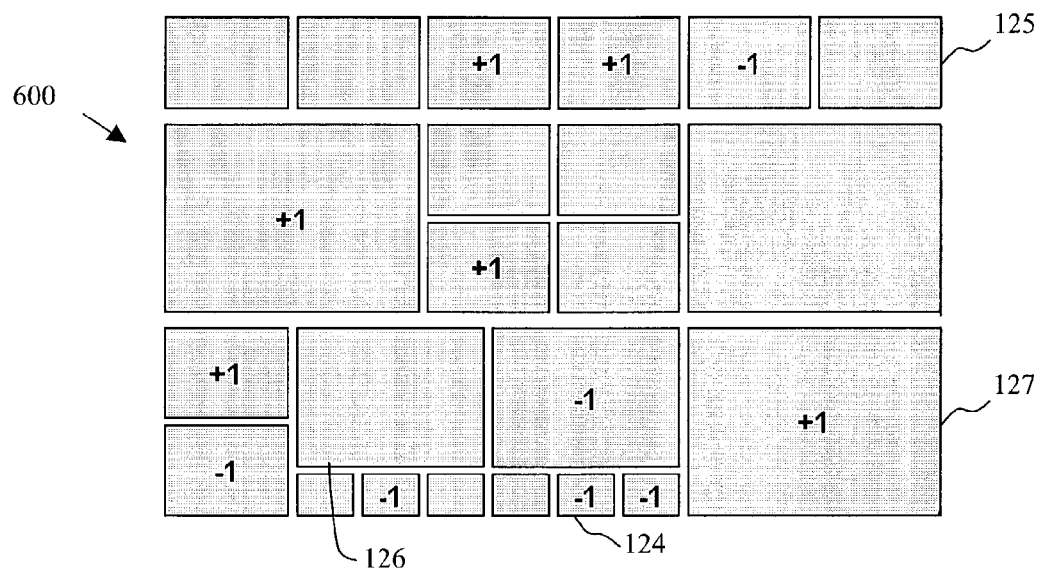
FIG. 6 shows a representative layout for a 10×12 image summary generated by using various exemplary embodiments of the image layout systems and methods according to this invention, where four image sizes are input.

FIG. 6 shows a representative layout 600 for a 10×12 image summary generated by using various exemplary embodiments of the image layout systems and methods according to this invention, where four input image sizes are used. The representative layout 600 includes images of the four image sizes 124, 125, 126, and 127. It should be appreciated that the representative layouts 500 and 600, because they include images of four different sizes, use fewer images than the representative layouts 100-400 that use three image sizes, due to the larger area of the larger images. Again, each resized image includes a number representing how that image is resized.

In various exemplary embodiments of the system and methods according to this invention, when determining a layout for an image summary, combinations of counts of image sizes that would fit into a particular row of the layout are considered. For example, a row with a size that is three small images 121 high and six small images 121 wide can be filled with three different combinations of counts of image sizes: 0,0,2; 5,1,1; and 9,0,1. In each of these three image counts, the first number represents the number of small images 121, the second number represents the number of medium images 122, and the third number represents the number of large images 123. These are the only image counts that can fill a row that is three small images 121 high and six small images 121 wide because, according to the various exemplary embodiments of the systems and methods according to this invention, the height of a row is defined by the largest image size contained in that row. Therefore, each image count must contain at least one large image 123.

Figure 8:
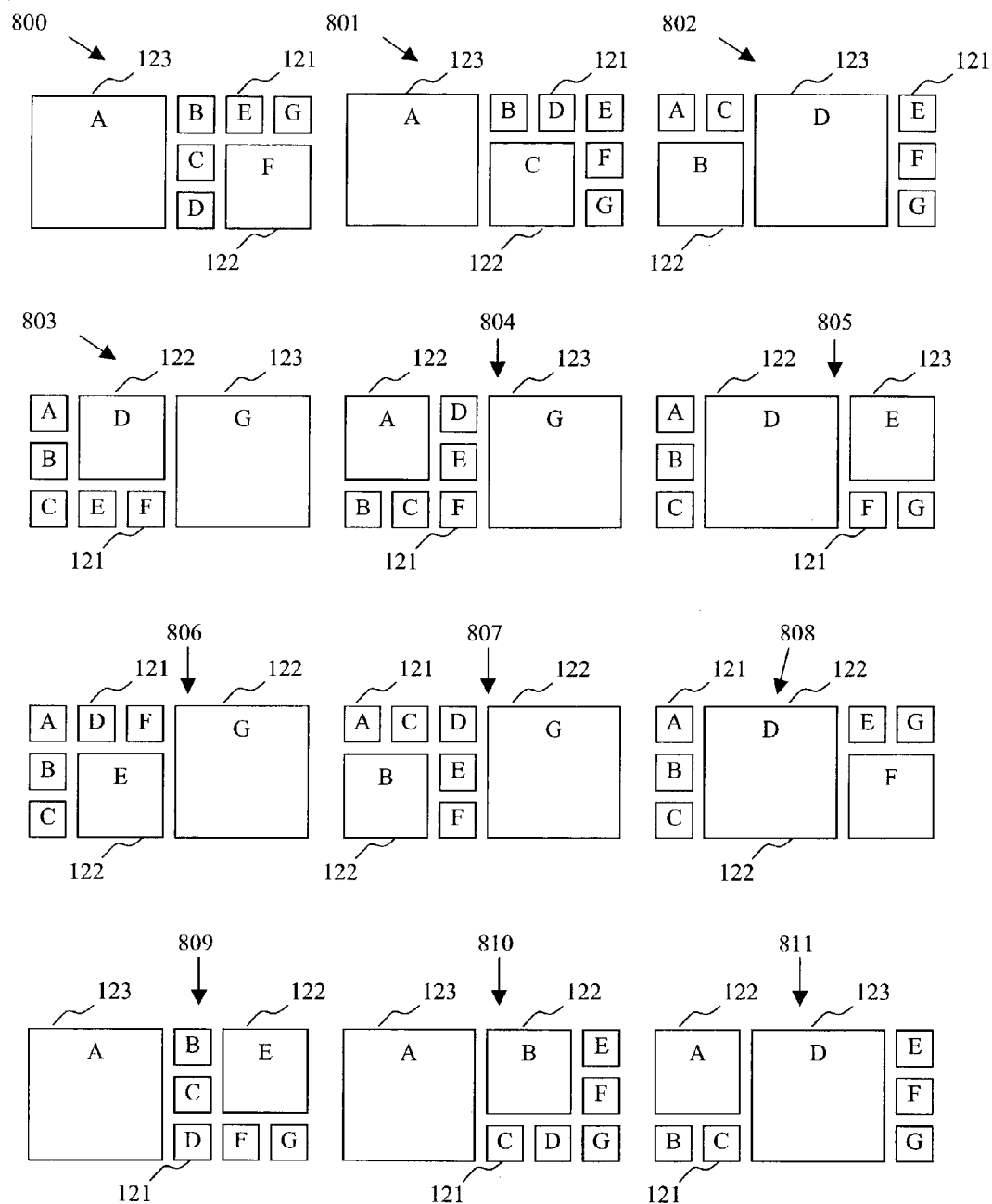
FIG. 8 shows the twelve different layout permutations that may result when a row contains five small images, one medium image, and one large image, i.e., for a row that has an image count of "5,1,1"

FIG. 7 shows the only permutation for the layout when the current row contains only two large images 123, i.e., the row has an image count of "0,0,2". There is only one layout permutation because there is no other way to arrange two large images and maintain the order in which the images were input. FIG. 8 shows the twelve different layout permutations, 800-811, that may result when the row contains five small images 121, one medium image 122, and one large image 123, i.e., the row has an image count of "5,1,1". That is, each layout permutation 800-811 represents a different layout that will be considered by various exemplary embodiments of the systems and methods according to this invention to fill the current row that is three small images 121 high and six small images 121 wide with five small images 121, one medium image 122, and one large image 123. Similarly, FIG. 9 shows the four layout permutations, 900-903, of the layouts that would result when the row contains nine small images 121 and one large image 123, i.e., the row has an image count of "9,0,1".

It should be appreciated that it is a desirable quality of the various exemplary embodiments of the systems and methods according to this invention that the order in which the original images are input is maintained within each layout permutation. Maintaining the image order is a desirable quality because a layout is intended to represent the information contained in the input images. As the importance of the image is reflected by the size of the images, the temporal relationship of the images is reflected by the order of the images. For example, if seven images A-G are input, it is desirable that their order is maintained within each permutation as demonstrated by the letters in layout permutations 800-811, in a right-left, top-bottom fashion.

In various exemplary embodiments of the systems and methods according to this invention, points are assigned to a layout for qualities that are undesirable in the final layout. Such qualities may include resizing of an image, empty space in the bottom row, a large proportion of a row having the same image size adjacent to one another, or any other quality that may impact the aesthetics of the final layout. Therefore, the "lowest" scoring layout will contain the "least" amount of undesirable qualities. As used herein, the terms "lowest" and "least amount of undesirable qualities" connote a condition where one layout is deemed better than any other layout because the penalty score of the first layout is lower than the penalty score of the other layouts.

It should be appreciated that it may always be possible, given sufficient time and/or computational resources, to define a layout that has a lowest possible penalty score. With the exception of the second variation described in [0086], all embodiments and variations described here find a layout with the lowest possible penalty score. Several of the embodiments and variations described are designed to greatly reduce the time and/or computational resources required to find such a layout.

FIGS. 10-13 are a flowchart that outlines one exemplary embodiment of a method for determining a layout with the "lowest" penalty score. As shown in FIG. 10, operation of the method begins in step S100, and continues to step S102, where a number of images n, each having a preassigned importance score, are input. Next, in step S104, a total area for the video summary, such as, for example, nine inches wide by seven inches tall, is input. Then, in step S106, image sizes are assigned relative to the importance of the input images, such that the total image area of the input images approximately matches the input total area. Operation then continues to step S108.

Any number of relative image sizes may be input, e.g., 121-123 for three different sizes or 124-127 for four different sizes. It should be appreciated that, in general, while not strictly necessary, all images should have widths and heights that are integer multiples of the width and height of the smallest image. It should be appreciated that the smallest image size may be input and then the total area for the video summary may be expressed in terms of the smallest image size. Thus, instead of expressing the area in inches or centimeters, the area can be expressed, for example, as nine times the width of the smallest image 121 or 124 by seven times the height of the smallest image 121 or 124.

In step S108, the height of the bottom row is set to the smallest image size. Next, in step S110, a first unique image count, or a next unique image count, for the bottom row is determined. Then, in step S112, the penalty score for each layout permutation of the determined first or next unique image count for the bottom row is determined. Operation then continues to step S114. The penalty score for each layout permutation for the determined image count is determined by comparing the qualities of that layout permutation with the qualities, such as the preassigned image size, of the corresponding subset of input images.

In step S114, the image count and the corresponding penalty score for that image count are stored as a partial layout in an ordered list. Then, in step S116, a determination is made whether all bottom row image counts have been considered for the current row height. If not, operation returns to step S110. If so, operation continues to step S118.

In various exemplary embodiments, the corresponding penalty score of the partial layout determined in step S114 is the lower bound, or the penalty score of the lowest scoring layout permutation obtained for the current image count. For example, with a 6×3 row and 7 images, the configurations shown in FIG. 8 are possible. With assigned image sizes "1,2,2,2,1,3,3", the assigned image count is 2,3,2, corresponding to 2 small, 3 medium and 2 large images, and the possible image count for the row is "5,1,1". When just looking at the image size counts to determine the lower bound for the score, three size 2 images would have to be reduced to size 1 and one size 3 image would have to be reduced to size 2. However, in this example, the lowest actual score would be achieved by permutations 803 and 807, which reduce two size 2 images to size 1 and one size 3 image to size 1, a reduction by two sizes which is undesirable. It should be appreciated, however, that for many permutations of assigned image sizes, the lower bound of the score and the actual score are the same.

In step S118, a determination is made whether the current row height is equal to the height of the largest image size. If the height of the bottom row is not equal to the largest image size, then all possible bottom row image counts have not been considered. If the row height of the current row is not equal to the height of the largest image, operation continues to step S120. Otherwise, operation jumps to step S122. In step S120, the current height of the bottom row is increased in height by the height of the smallest image. Operation then again returns to step S110.

In contrast, in step S122, the partial layout with the lowest score is selected from the ordered list. Then, in step S124, a determination is made whether a final layout score has been determined. If a final score for a full layout, as opposed to the partial layout, which is all that has been determined the first time step S124 is encountered, has not been determined, operation jumps directly to step S132. Otherwise, operation continues to step S126.

In step S126, a determination is made whether the selected partial layout has a penalty score that is less than the penalty score of the current previously-determined final layout. If so, the selected partial layout could result in a lower scoring final layout. As a result, operation again jumps to step S132. Otherwise, the selected partial layout already has an equal or worse penalty score than the current final layout. Accordingly, operation continues to step S128.

In step S128, the final layout is output. Operation of the method then continues to step S130, where operation of the method ends. Because the various exemplary embodiments of a method for determining a layout with the lowest penalty score according to this invention evaluate partial layouts with the lowest score first, a final layout that has a penalty score lower than the penalty score of the current partial layout must be the lowest scoring final layout.

In step S132, the row height for the next highest row for the current selected partial layout is set to the height of the smallest image size. Then, in step S134, a first or next unique image count for the next highest row is determined based on the selected partial layout. Next, in step S136, a determination is made, based on the determined first or next unique image count, whether enough unused images remain to fill the remaining rows of the layout even if the remaining rows are filled only with images of the largest possible size using as few images as possible. If there are not enough original images remaining that have not been used in either the current partial layout or determined image count to fill the remaining space in the layout, then the determined image count cannot result in a final layout. Operation therefore jumps to step S140. Otherwise operation continues to step S138.

In step S138, a determination is made whether, based on the determined first or next unique image count, the remaining layout area will be exceeded even if the remaining rows of the layout are filled only with images of the smallest image size. If the layout area will be exceeded, there is no way that the determined image count could result in a final layout because all of the remaining images cannot fit in the final layout. Accordingly, operation again continues to step S140. Otherwise, operation jumps to step S142.

In step S140, the determined first or next unique image count is discarded. Operation then returns to step S130. In contrast, in step S142, the penalty score of the first or next unique image count is determined as the lower bound of lowest scoring layout permutation of the determined image count. Operation then continues to step S144.

It should be appreciated that the new partial layout created in step S134 does not become the current selected partial layout. That is, the determined image count and the score of that image count are associated with the current selected partial layout, creating a new partial layout. For example, if the selected partial layout contains nine images in the bottom row, then the penalty score for each layout permutation of the current next highest row would be determined by comparing the qualities of the images that immediately proceed the nine images used in the bottom row partial layout, as those images occur in the current next highest row based on the determined image count being considered. The lowest scoring of the various permutations of that image count would become the penalty score for that next highest row image count.

In step S144, a determination is made whether the new partial layout fills the total area of the video summary with all of the input images. If not, operation continues to step S146. Otherwise, operation jumps to step S148. In step S146, the new partial layout and the penalty score for the new partial layout are stored in the ordered list of partial layouts. It should be appreciated that the penalty score for the new partial layout is simply the combined penalty scores for each row of that new partial layout. Operation then jumps directly to step S160.

In contrast, in step S148, the input images are placed in the rows according to the row image counts used to determine the new partial layout score, to create a candidate final layout. Then, in step S150, the candidate final layout score is determined for the candidate final layout by comparing each image in the candidate final layout with each input image. Next, in step S152, a determination is made whether a final layout score has been previously determined. If so, operation continues to step S154. Otherwise, operation jumps directly to step S158.

In step S154, a determination is made whether the score of the previously-determined final layout is less than or equal to the score of the selected candidate final layout. If so, operation continues to step S156. Otherwise, operation again jumps directly to step S158.

In step S156, the candidate final layout is discarded. Operation then jumps to step S160. In contrast, in step S158, the candidate final layout is selected as the current final layout, thereby replacing the previous final layout. Accordingly, the candidate final layout score becomes the current final layout score. Operation then continues to step S160.

In step S160, a determination is made whether all of the first or next unique image counts for the current selected partial layout have been determined. If not, operation returns to step S130. Otherwise, operation continues to step S162, where a determination is made whether the row height for the next highest row is equal to the largest image size. If not, operation continues to step S164. Otherwise, operation jumps to step S166. In step S164, the current next highest row height is increased by the height of the smallest image. Operation then again returns to step S130. In contrast, in step S166, the current selected partial layout is again discarded. Operation then returns to step S122.

That is, if the row height for the current next highest row is equal to the largest image size, then all first or next image counts for the next highest row of the current selected partial layout have been considered and either become part of a new partial layout stored in the list of partial layouts or are discarded. If the row height is determined to be equal to the height of the largest image, all of the image counts for the next highest row of the current selected partial layout have been considered. Therefore, every possible expansion of that layout has been considered.

Figure 11:
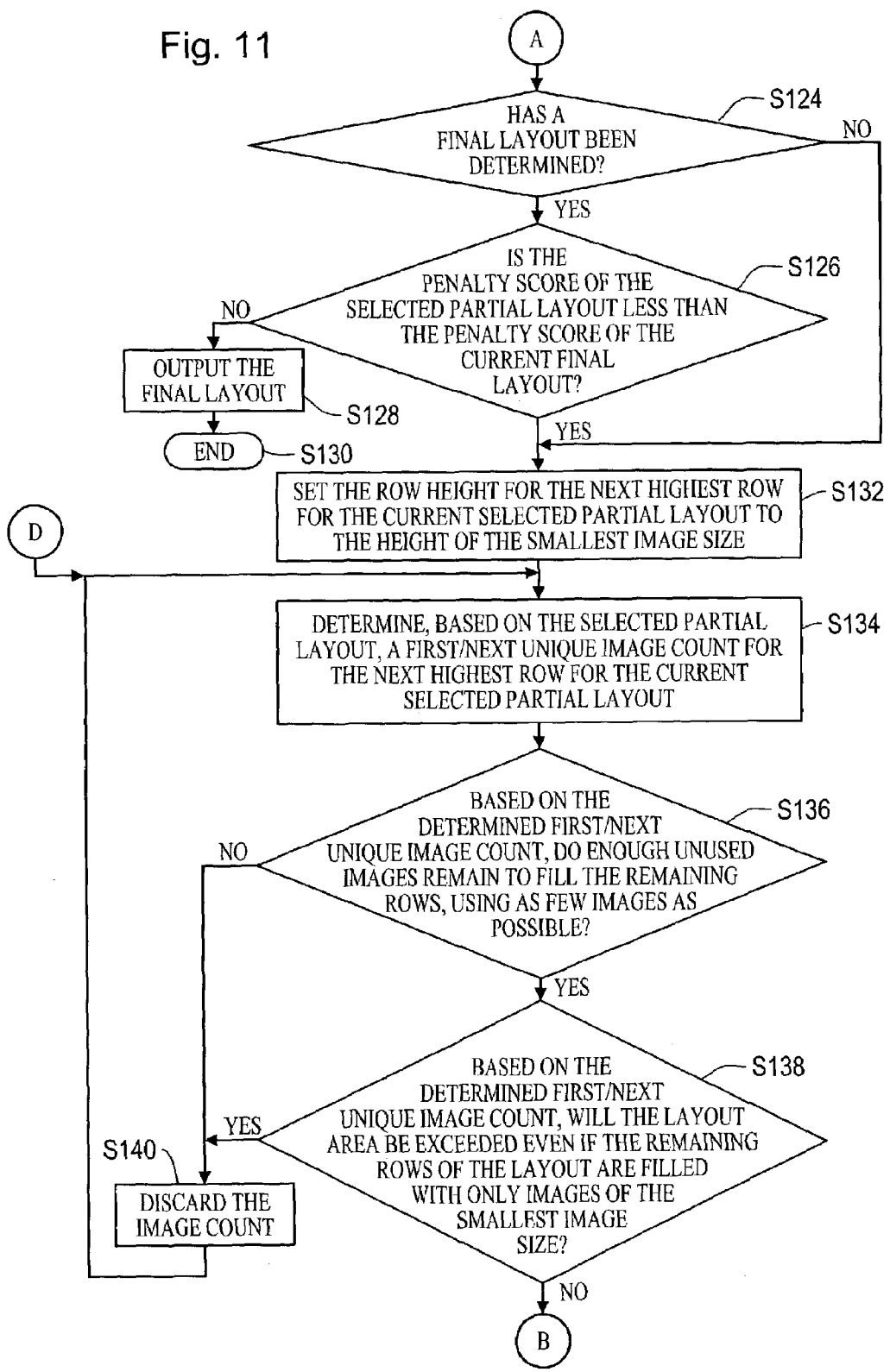
Figure 12:
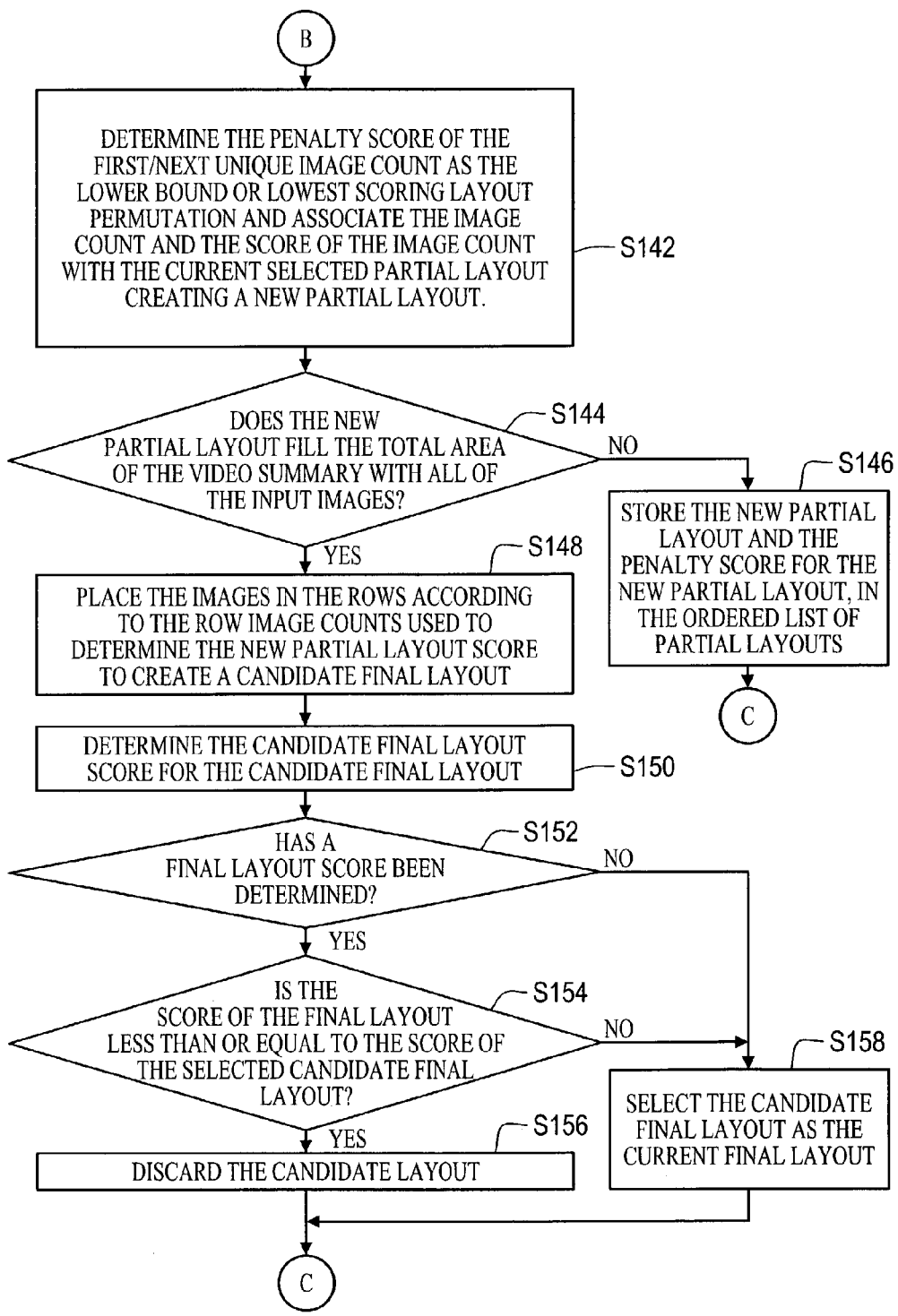
Figure 13:
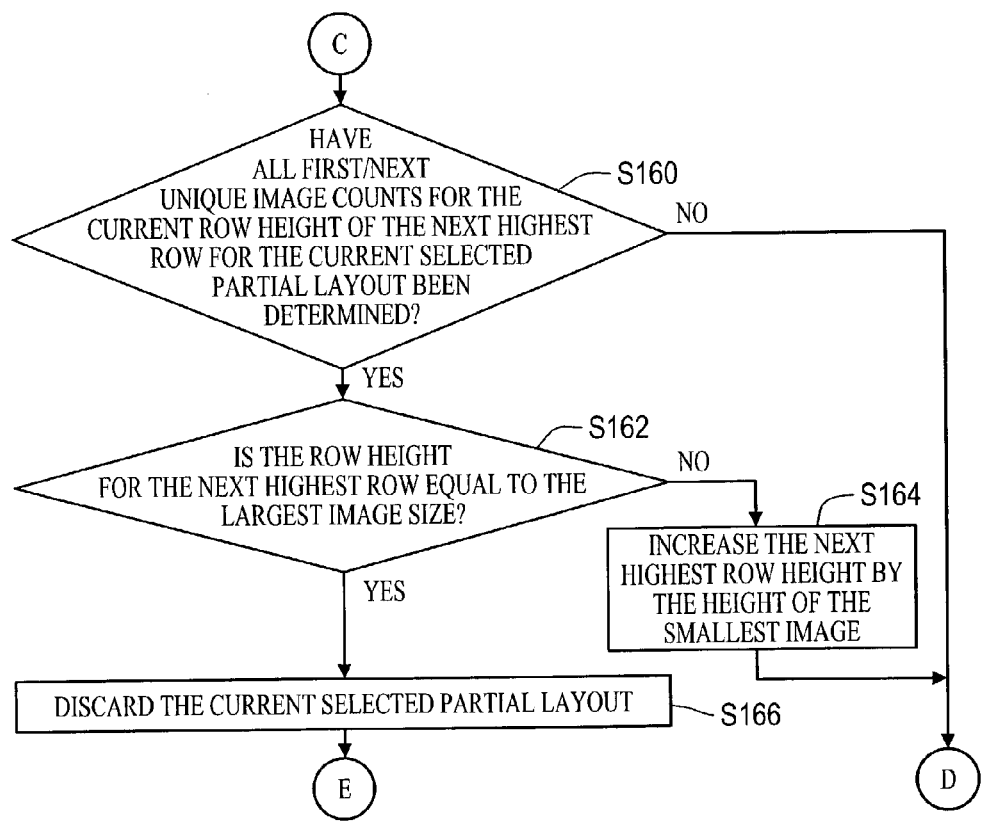

While the first exemplary embodiment of the method for determining a final layout shown in FIGS. 10-12 is reasonably fast for determining layouts with a small number of input images, it is undesirably slow for determining layouts with a large number of input images. This time requirement is a result of how the first exemplary embodiment of the method for determining the final layout shown in FIGS. 10-13 enumerates layout permutations given counts of image sizes. In steps S112 and S142, the first exemplary embodiment of the method for determining the final layout permutes through the possible sizes for each image, and for each layout permutation determines to what extent that layout permutation meets the qualities of the input images.

In order to address this time requirement, a first variation of the first exemplary embodiment of the method for determining the final layout according to this invention enumerates only the image counts that conform to the image size of the images input in step S104. This first variation applies when determining the possible row configurations as exemplified in steps S112 and S142 of the first exemplary embodiment of the method for determining the final layout. This first variation significantly reduces the time required to arrive at a final layout. However, for layouts with a large number of input images, the first variation as applied to the first embodiment of a method for determining a final layout is still less than desirable.

Figure 14:
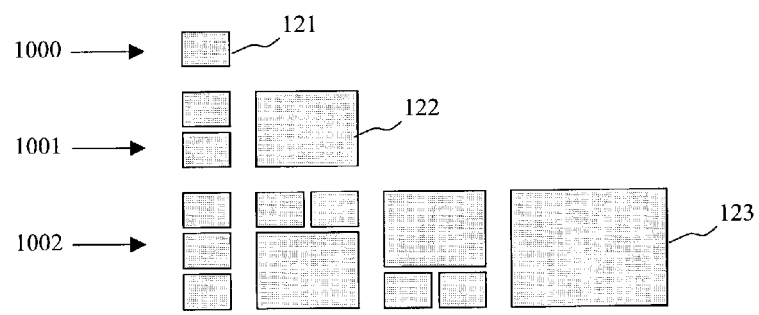
FIG. 14 shows the building blocks that various exemplary embodiments of the systems and methods according to this invention use when determining a final layout for images input with three relative sizes.

A second exemplary embodiment of the systems and methods for determining the final layout according to this invention reduces the time necessary to arrive at a final layout by arranging possible image sizes into building blocks. FIG. 14 depicts various exemplary embodiments of the building blocks that the second exemplary embodiment of the systems and methods according to this invention could use when determining a final layout for images input with three relative image sizes 121, 122, and 123. A first row 1000 shows the building block that is considered for a row that includes only images of size 121. A second row 1001 shows the sets of building blocks that are considered for a row that includes at least one image of size 122. A third row 1002 shows the sets of building blocks that are considered for a row that includes at least one image of size 123.

Figure 15:
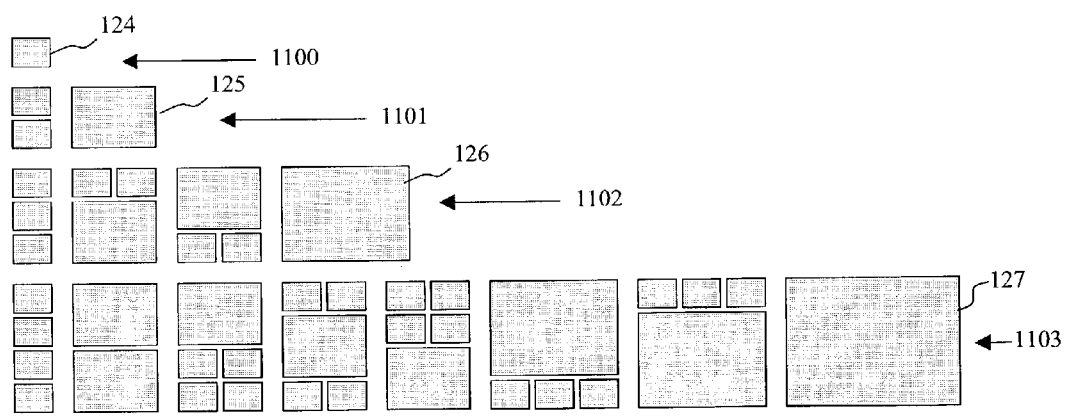
FIG. 15 shows the building blocks that the various exemplary embodiments of the systems and methods according to this invention uses when determining a final layout for images input with four relative sizes.

Similarly, FIG. 15 depicts various exemplary embodiments of the building blocks that the second exemplary embodiment of the methods and systems according to this invention could use when determining a final layout for images input with four relative image sizes 124, 125, 126, and 127. A first row 1100 shows the building block that is considered for a row that includes only images of size 124. A second row 1101 shows the sets of building blocks that are considered for a row that includes at least one image of size 125. A third row 1102 shows the sets of building blocks that are considered for a row that includes at least one image of size 126. Finally, a fourth row 1103 shows the sets of building blocks that are considered for a row that includes at least one image of size 127.

Instead of determining layout permutations of image sizes that can fill a row, as in steps S112 and S142 of the first exemplary embodiment of the method for determining the final layout according to this invention, the second exemplary embodiment of the method for determining the final layout according to this invention determines combinations of building blocks. Because of the smaller number of components to consider, both determining the layout permutations and completing the layout for final partial layouts is faster than in the first exemplary embodiment of the method for determining the final layout according to this invention.

Figure 16:
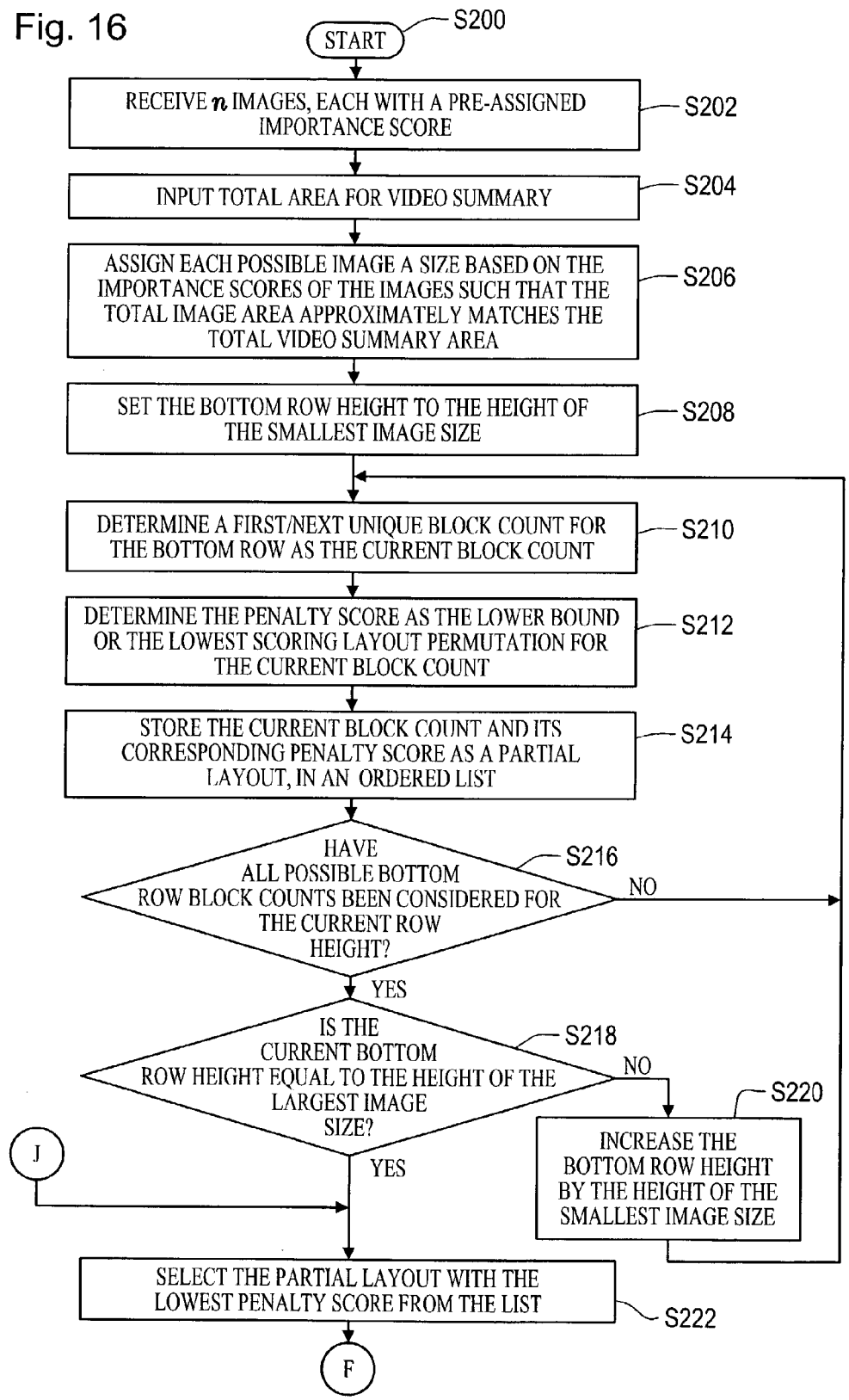
FIGS. 16-19 are a flow chart outlining the second exemplary embodiment of a method for determining a final layout according to this invention.
Figure 17:
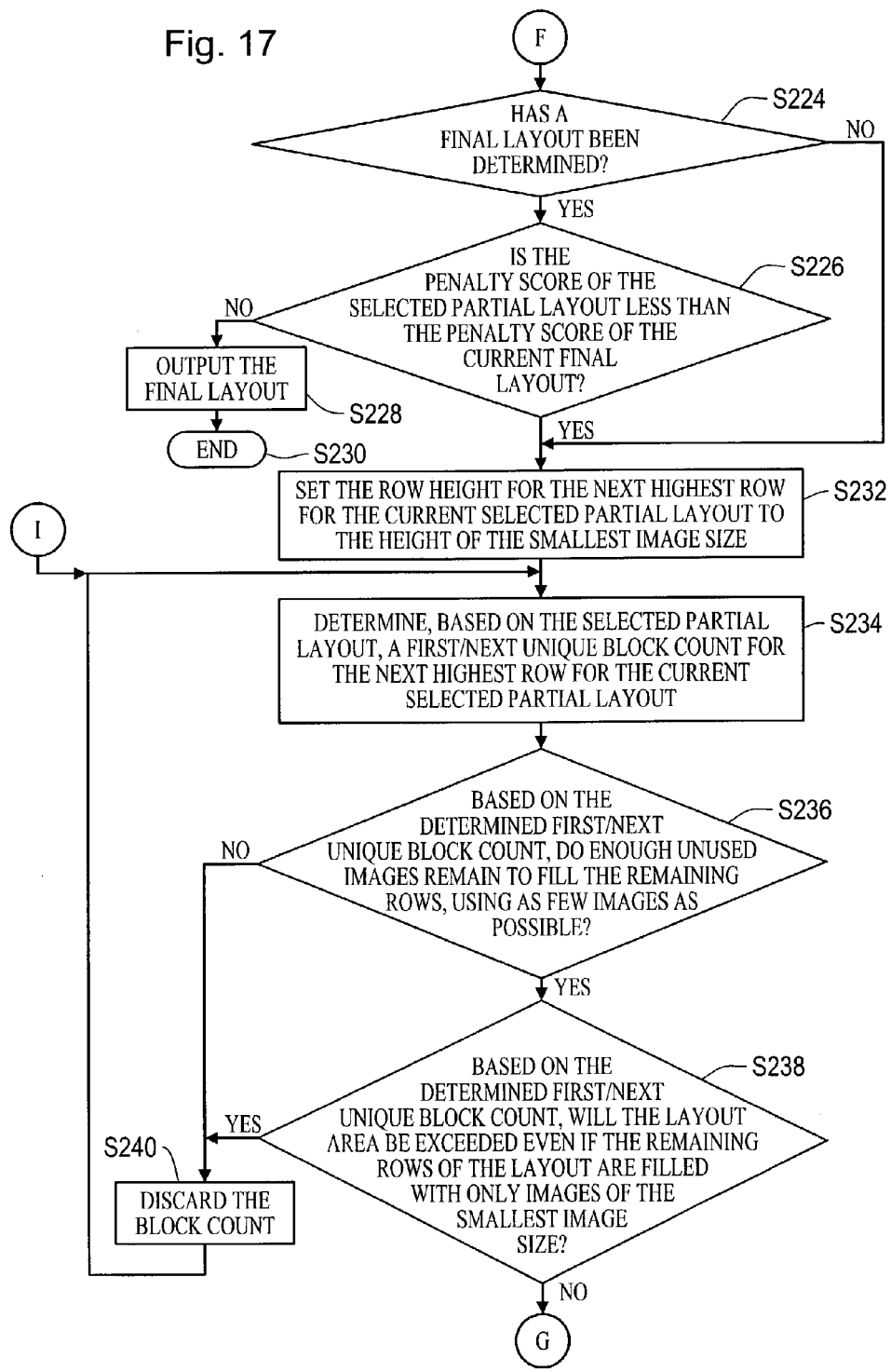
Figure 18:
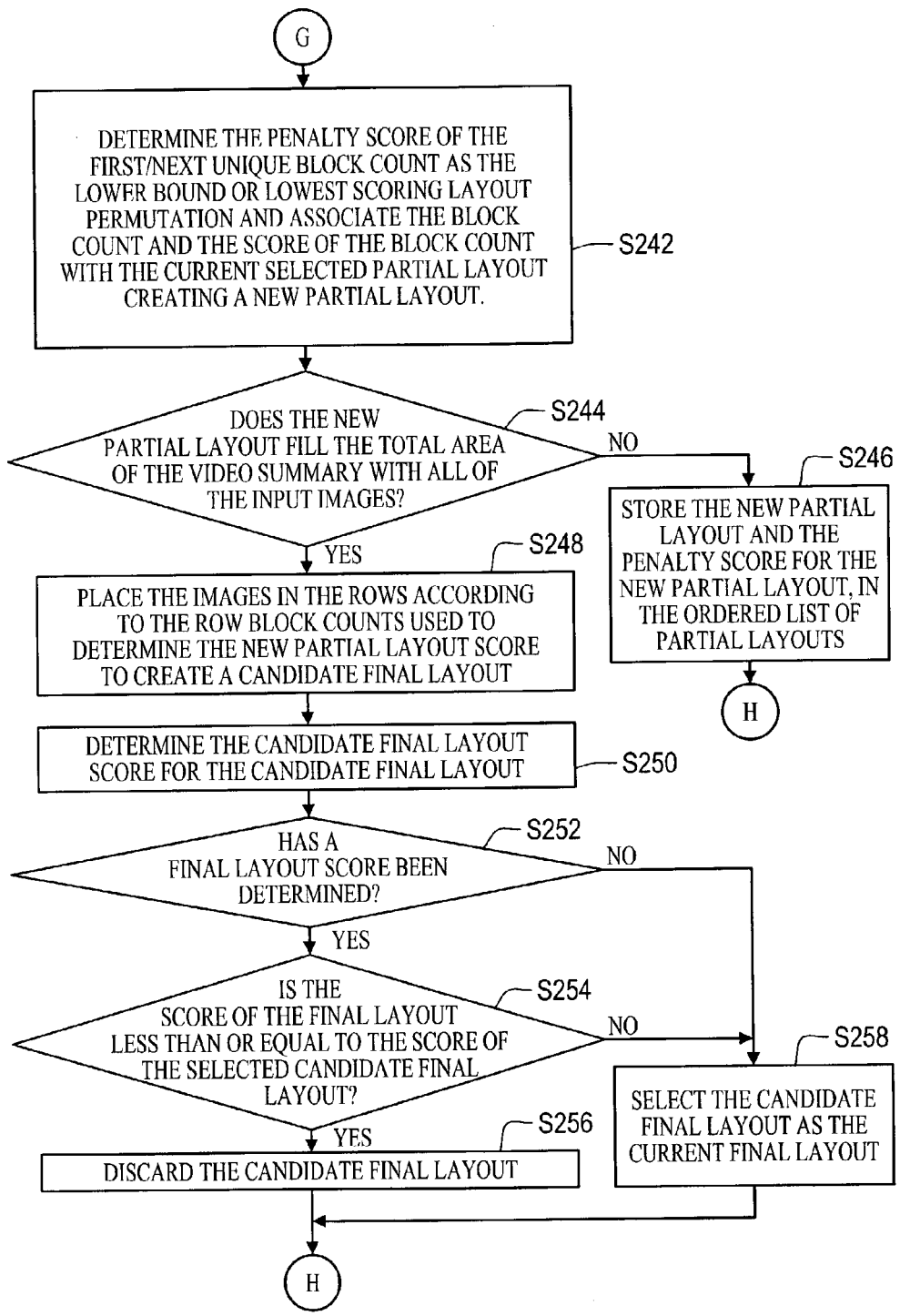
Figure 19:
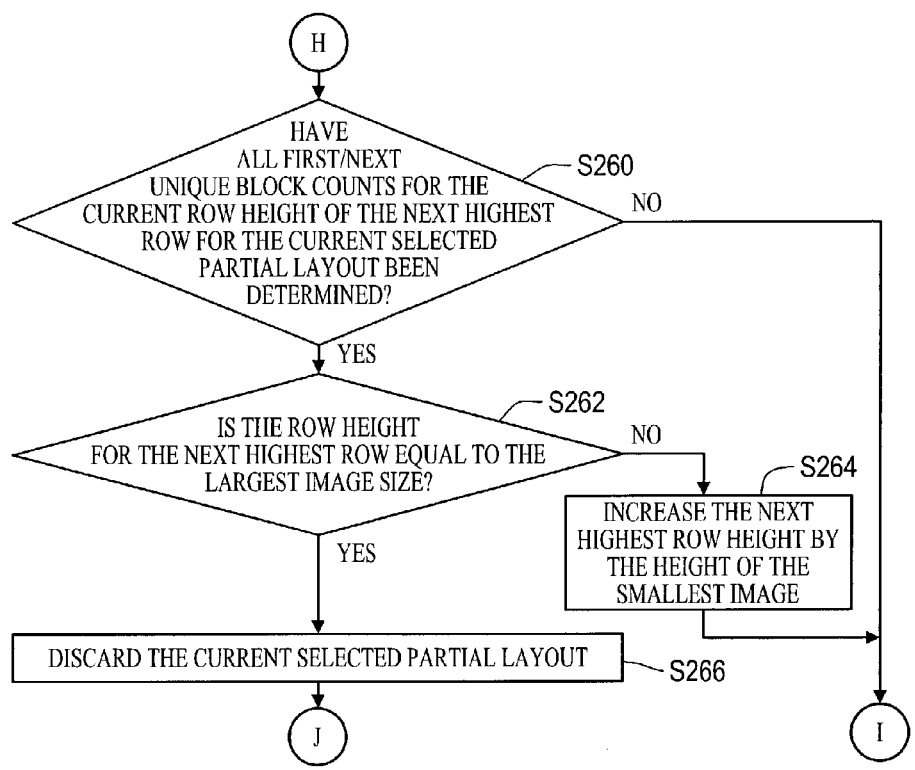

FIGS. 16-19 are a flowchart that outlines this second exemplary embodiment of the method for determining the layout with the "lowest" penalty score. As shown in FIG. 16, operation of the method begins in step S200, and continues to step S202, where a number of images n, each having a preassigned importance score, are input. Next, in step S204, a total area for the video summary, such as, for example, nine inches wide by seven inches tall, is input. Then, in step S206, image sizes are assigned relative to the importance of the input images, such that the total image area of the input images approximately matches the input total area. Operation then continues to step S108.

Any number of relative image sizes may be input, e.g., 121-123 for three different sizes or 124-127 for four different sizes. It should be appreciated that, in general, while not strictly necessary, all images should have widths and heights that are integer multiples of the width and height of the smallest image. Again, it should be appreciated that the smallest image size may be input and the total area for the video summary may be expressed in terms of the smallest image size. Thus, instead of expressing the area in inches or centimeters, the area can be expressed, for example, as nine times the width of the smallest image 121 or 124 by seven times the height of the smallest image 121 or 124.

In step S208, the height of the bottom row is set to the smallest image size. Next, in step S210, a first unique block count, or a next unique block count, for the bottom row is determined. Then, in step S212, the penalty score for each layout permutation of the determined first or next block count for the bottom row is determined. Operation then continues to step S214. The penalty score for each layout permutation for the determined block count is determined by comparing the qualities of that layout permutation with the qualities, such as the preassigned image size, of the corresponding subset of input images.

In step S214, the block count and the corresponding penalty score for that block count are stored as a partial layout in an ordered list. Then, in step S216, a determination is made whether all bottom row block counts have been considered for the current row height. If not, operation returns to step S210. If so, operation continues to step S218.

In step S218, a determination is made whether the current row height is equal to the height of the largest image size. If the height of the bottom row is not equal to the largest image size, then all possible bottom row block counts have not been considered. If the row height of the current row is not equal to the height of the layout image, operation continues to step S220. Otherwise, operation jumps to step S222. In step S220, the bottom row is increased in height by the height of the smallest image. Operation then again returns to step S210.

Figure 29:
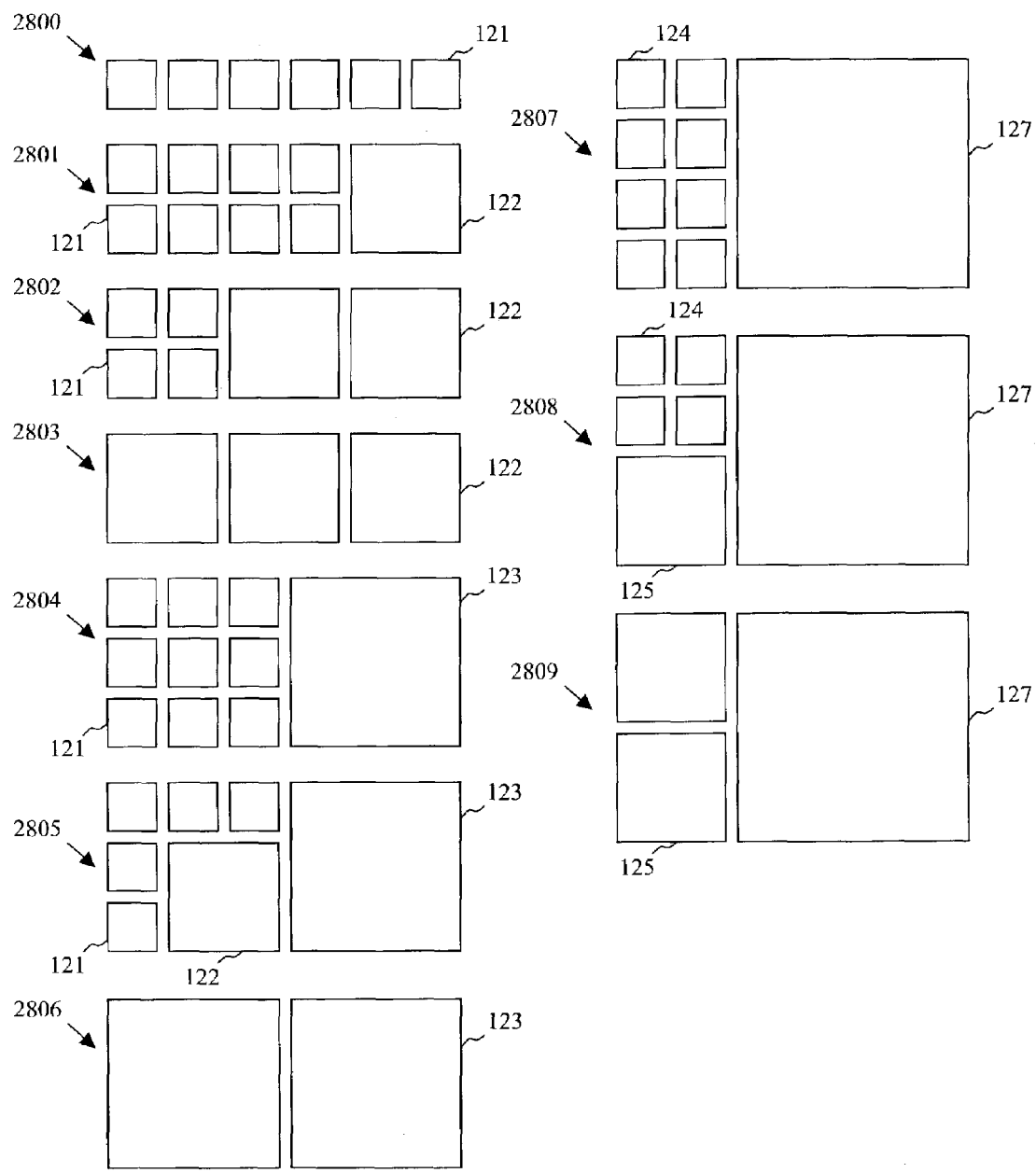
FIG. 29 shows various row heights that would be considered for an image layout 6 small images 121,124 wide, using 3 or 4 image sizes.

FIG. 29 shows various row heights that would be considered for an image layout 6 small images 121,124 wide, using 3 or 4 image sizes. First, a row 2800 would be considered using the smallest image size 121. Then, a number of rows 2801, 2802 and/or 2803 (and various permutations of the layouts of these rows), whose height is 2 times the smallest image 121, would be considered using images variously having the sizes 121 and 122. Next, a number of rows 2804, 2805 and/or 2806 (and various permutations of the layouts of these rows), whose height is 3 times the smallest image 121, would be considered using images variously having the sizes 121, 122 and 123. Finally, if the layout uses four image sizes, a number of rows 2807, 2808, and/or 2809 (and various permutations of the layouts of these rows), whose height is 4 times the smallest image 124, would be considered using images variously of the sizes 124, 125, and 127 (note size 126 is not used because that would require a row at least 7 small images 121,124 wide).

In contrast, in step S222, the partial layout with the lowest score is selected from the ordered list. Then, in step S224, a determination is made whether a final layout score has been determined. If a final score for a full layout, as opposed to the partial layout, which is all that has been determined the first time step S224 is encountered, has not been determined, operation jumps directly to step S232. Otherwise, operation continues to step S226.

In step S226, a determination is made whether the selected partial layout has a penalty score that is less than the penalty score of the current previously-determined final layout. If so, the selected partial layout could result in a lower scoring final layout. As a result, operation again jumps to step S232. Otherwise, the selected partial layout already has an equal or worse penalty score than the current final layout. Accordingly, the operation continues to step S228.

In step S228, the final layout is output. Operation of the method then continues to step S230, where operations of the method ends. Because the various exemplary embodiments of a method for determining a layout with the lowest penalty score according to this invention evaluate partial layouts with the lowest score first, a final layout that has a penalty score lower then the penalty score of the current partial layout must be the lowest scoring final layout.

In step S232, the row height for the next highest row for the current selected partial layout is set to the height of the smallest image size. Then, in step S234, a first or next unique block count for the next highest row is determined based on the selected partial layout. Next, in step S236, a determination is made, based on the determined first or next unique block count, whether enough unused images remain to fill the remaining rows of the layout, even if the remaining rows of the layout are filled only with images of the largest possible size. If there are not enough original images remaining that have not been used in either the current partial layout or the determined block count to fill the remaining space in the layout, then the determined block count cannot result in a final layout. Therefore, operation jumps to step S240. Otherwise, operation continues to step S238.

In step S238, a determination is made whether, based on the determined first or next unique block count, the remaining layout area will be exceeded even if the remaining rows of the layout are filled only with images of the smallest image size. If the layout area will be exceeded, there is no way that the determined block count could result in a final layout because all of the remaining images cannot fit in the final layout. Accordingly, operation continues to step S240. Otherwise, operation jumps to step S242.

In step S240, the determined first or next unique block count is discarded. Operation then returns to step S230. In contrast, in step S242, the penalty score of the first or next unique block count is determined as the lower bound of lowest scoring layout permutation of the determined block count. Operation then continues to step S244.

It should be appreciated that the new partial layout created in step S242 does not become the current selected partial layout. That is, the determined block count and the score of that block count are associated with the current selected partial layout, creating a new partial layout. For example, if the selected partial layout contains three blocks with a total of nine images in the bottom row, then the penalty score for each layout permutation of the current next highest row would be determined by comparing the qualities of the images that immediately proceed the nine images used in the blocks that make up the bottom row partial layout, as those images will make up the blocks in the current next highest row based on the determined block count being considered. The lowest scoring of the various permutations of that block count would become the penalty score for that next highest row block count.

In step S244, a determination is made whether the new partial layout fills the total area of the video summary with all of the input images. If not, operation continues to step S246. Otherwise, operation jumps to step S248. In step S246, the new partial layout and the penalty score for the new partial layout are stored in the ordered list of partial layouts. It should be appreciated that the penalty score for the new partial layout is simply the combined penalty scores for each row of that new partial layout. Operation then jumps directly to step S260.

In contrast, in step S248, the input images are placed in the rows according to the row block counts used to determine the new partial layout score, to create a candidate final layout. Then, in step S250, the candidate final layout score is determined for the candidate final layout by comparing each image in the candidate final layout with each input image. Next, in step S252, a determination is made whether a final layout score has been previously determined. If so, operation continues to step S254. Otherwise, operation jumps directly to step S258.

In step S254, a determination is made whether the score of the previously-determined final layout is less than or equal to the score of the selected candidate final layout. If so, operation continues to step S256. Otherwise, operation again jumps directly to step S258.

In step S256, the candidate final layout is discarded. Operation then jumps to step S260. In contrast, in step S158, the candidate final layout is selected as the current final layout, thereby replacing the previous final layout. Accordingly, the candidate final layout score becomes the current final layout score. Operation then continues to step S260.

In step S260, a determination is made whether all of the first or next unique block counts for the current selected partial layout have been determined. If not, operation returns to step S230. Otherwise, operation continues to step S262, where a determination is made whether the row height for the next highest row is equal to the largest image size. If not, operation continues to step S264. Otherwise, operation jumps to step S266. In step S264, the current next highest row height is increased by the height of the smallest image. Operation then again returns to step S230. In contrast, in step S266, the current selected partial layout is again discarded. Operation then returns to step S222.

That is, in step S262, the row height for the current next highest row is equal to the largest image size, then all first or next block counts for the next highest row of the current selected partial layout have been considered and either become part of a new partial layout stored in the list of partial layouts or are discarded. If the row height is determined to be equal to the height of the largest image, all of the block counts for the next highest row of the current selected partial layout have been considered. Therefore, every possible expansion of that layout has been considered.

Figure 20:
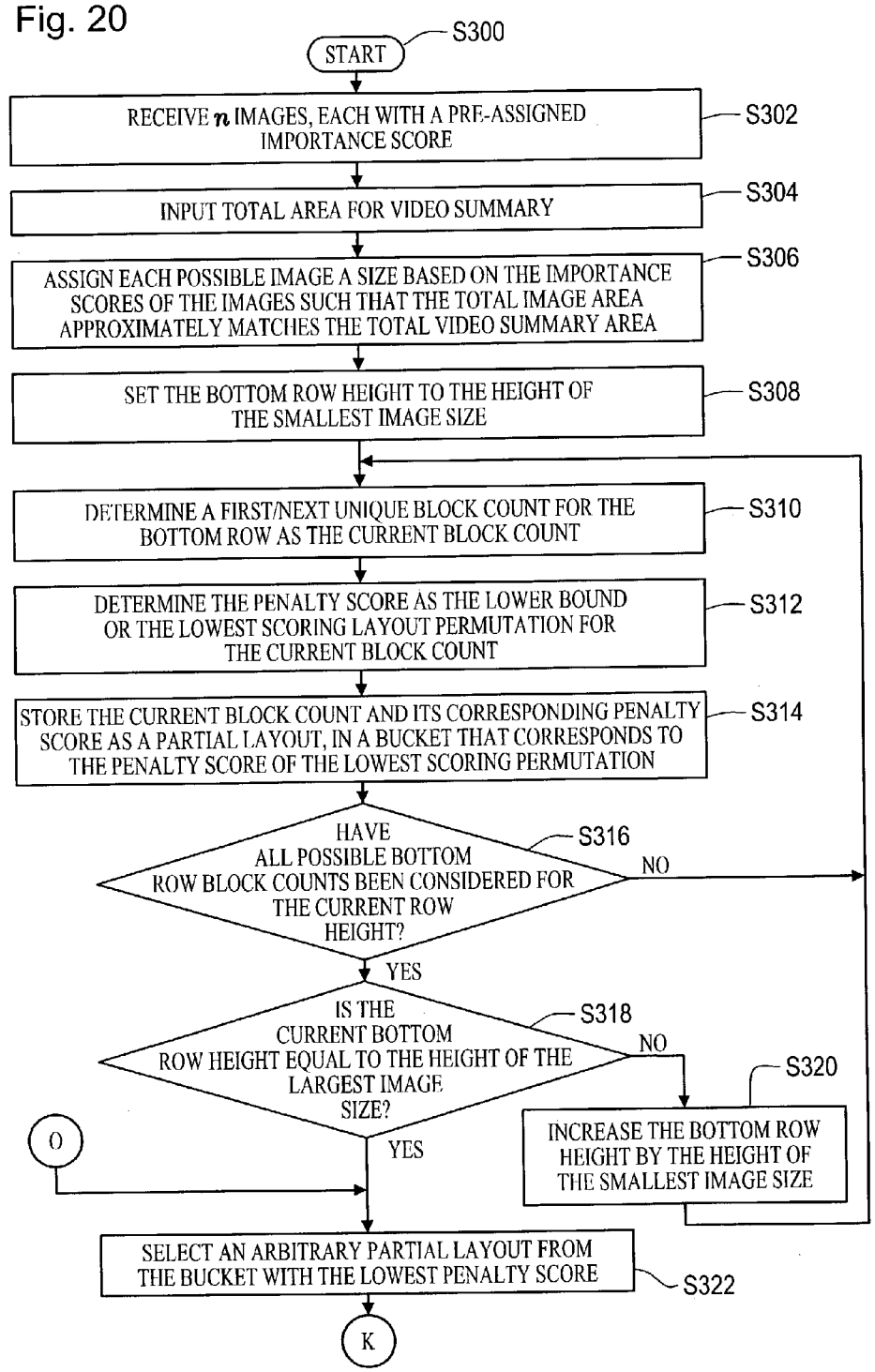
FIGS. 20-23 are a flow chart outlining the third exemplary embodiment of a method for determining a final layout according to this invention.
Figure 21:
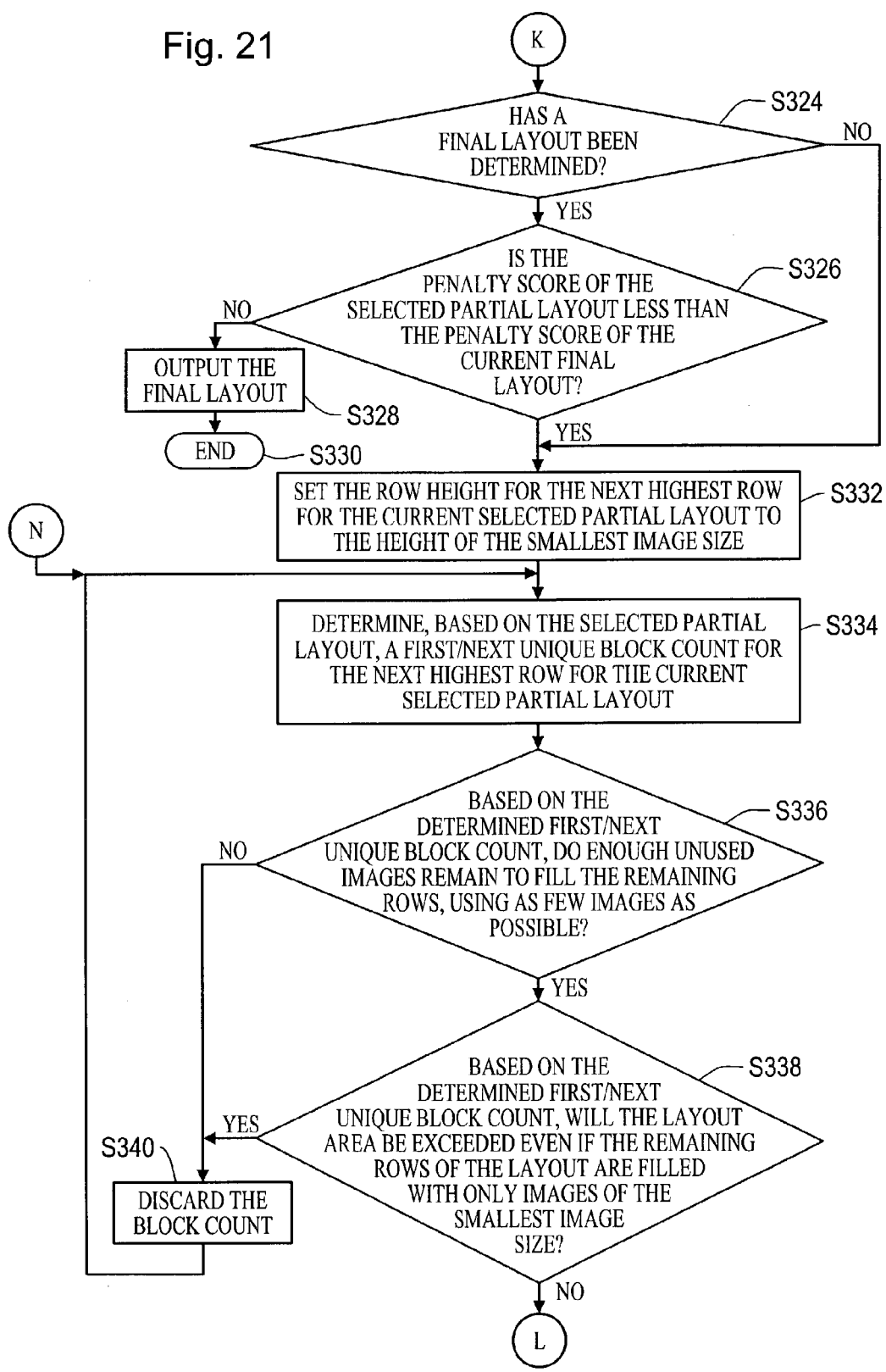
Figure 22:
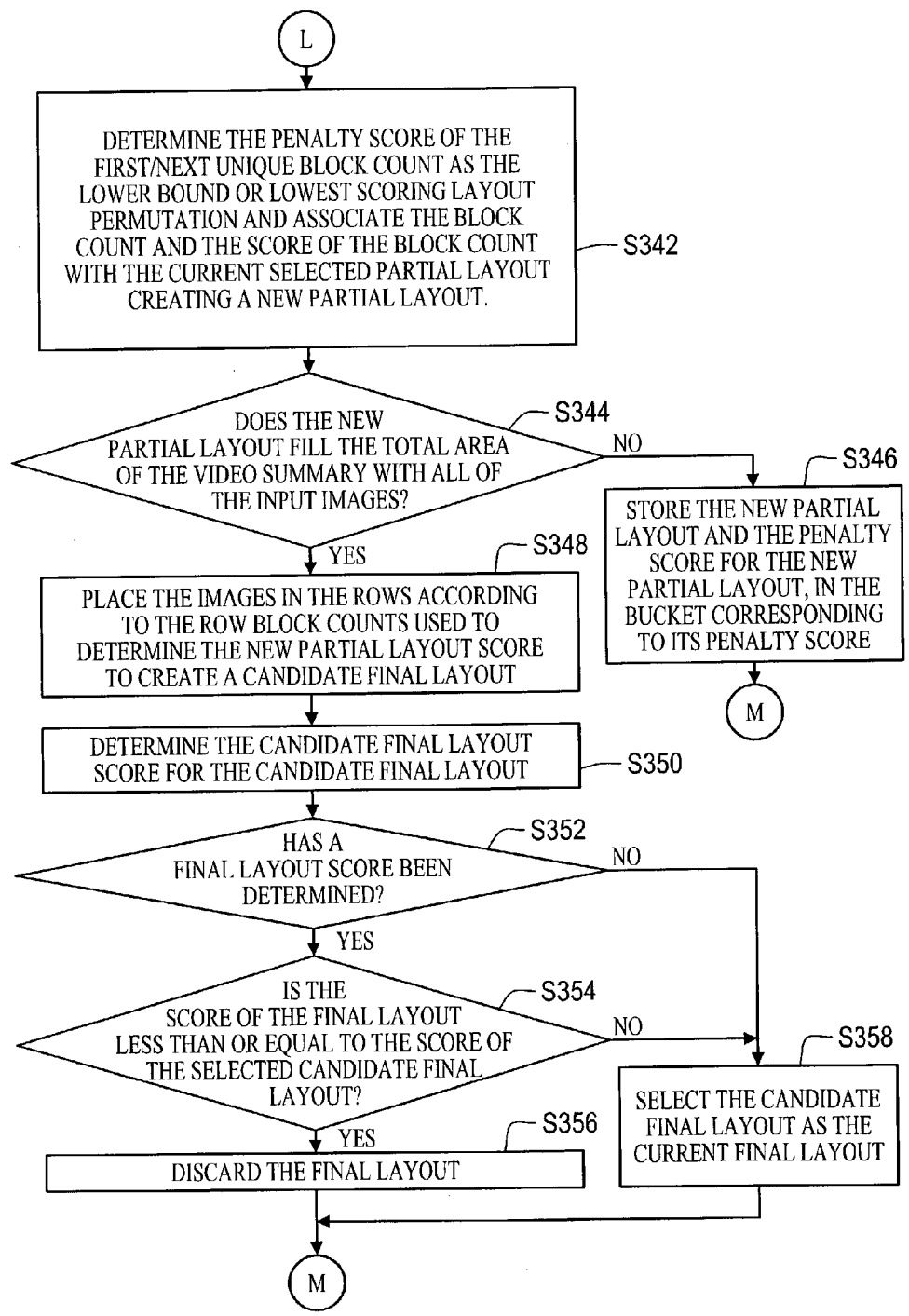
Figure 23:
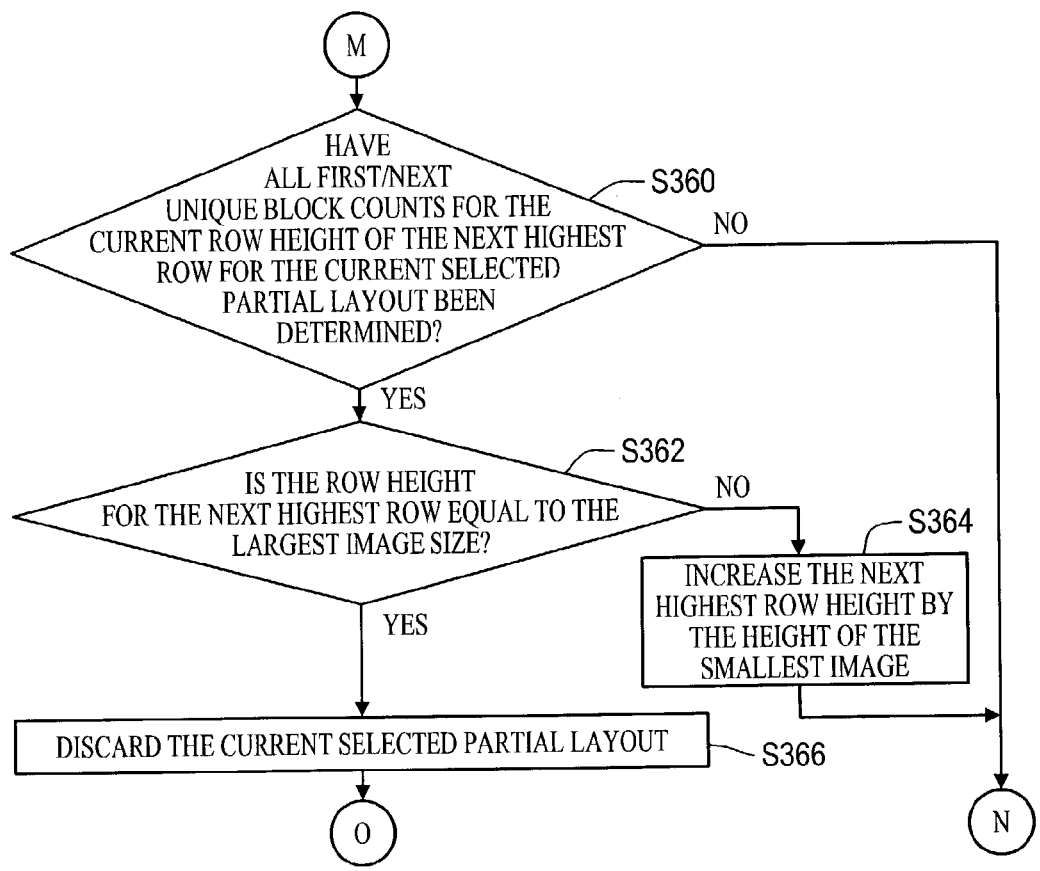

A third exemplary embodiment of a method for determining a final layout according to this invention decreases the time required to determine a final layout by decreasing the amount of information that must be retained, relative to that retained in the previous exemplary embodiments. FIGS. 20-23 are a flowchart that outlines the third exemplary embodiment of the method for determining the layout with the "lowest" penalty score. As shown in FIG. 20, operation of the method begins in step S300, and continues to step S302, where a number of images n, each having a preassigned importance score, are input. Next, in step S304, a total area for the video summary, such as, for example, nine inches wide by seven inches tall, is input. Then, in step S306, image sizes are assigned relative to the importance of the input images, such that the total image area of the input images approximately matches the input total. Operation then continues to step S108.

Any number of relative image sizes may be input, e.g., 121-123 for three different sizes or 124-127 for four different sizes. It should be appreciated that, in general, while not strictly necessary, all images should have widths and heights that are integer multiples of the width and height of the smallest image. Again, it should be appreciated that, if the smallest image size is input, the total area for the video summary may be expressed in terms of the smallest image size. Thus, instead of expressing the area in inches or centimeters, the area can be expressed, for example, as nine times the width of the smallest image 121 or 124 by seven times the height of the smallest image 121 or 124.

In step S308, the height of the bottom row is set to the smallest image size. Next, in step S310, a first unique block count, or a next unique block count, for the bottom row is determined. Then, in step S312, the penalty score for each layout permutation of the determined first or next block count for the bottom row is determined. Operation then continues to step S314. The penalty score for each layout permutation for the determined block count is determined by comparing the qualities of that layout permutation with the qualities, such as the preassigned image size, of the corresponding subset of input images.

In step S314, the block count and the corresponding penalty score for that block count are stored as a partial layout in a bucket that corresponds to the penalty score of the lowest scoring permutation of that block count. Then, in step S316, a determination is made whether all bottom row block counts have been considered for the current row height. If not, operation returns to step S310. If so, operation continues to step S318.

A bucket, as used herein, is a location where information can be placed without reference to the order in which it is stored. The corresponding penalty score of the partial layout is the lower bound, or the penalty score of the lowest scoring layout permutation obtained for that block count. Occasionally, when the operation of the method outlined in FIGS. 20-23 reaches step S314, a bucket is created corresponding to the penalty score of a partial layout and the partial layout is stored in that bucket. If, however, the penalty score of the partial layout corresponds to a bucket that has already been created by a previous operation of step S314, the partial layout will be stored in that preexisting bucket. By using buckets, rather than an ordered list, the third embodiment must only keep track of the order of the buckets, not the order of each individual partial layout.

In step S318, a determination is made whether the current row height is equal to the height of the largest image size. If the height of the bottom row is not equal to the largest image size, then all possible bottom row block counts have not been considered. If the row height of the current row is not equal to the height of the layout image, operation continues to step S320. Otherwise, operation jumps to step S322. In step S320, the bottom row is increased in height by the height of the smallest image. Operation then, returns to step S310.

In contrast, in step S322, an arbitrary partial layout is selected from the bucket corresponding to the lowest penalty score. Then, in step S324, a determination is made whether a final layout score has been determined. If a final score for a full layout, as opposed to the partial layout, which is all that has been determined the first time step S324 is encountered, has not been determined, operation jumps directly to step S328. Otherwise, operation continues to step S326.

In step S326, a determination is made whether the selected partial layout has a penalty score that is less than the penalty score of the current previously-determined final layout. If so, the selected partial layout could result in a lower scoring final layout. As a result, operation again jumps to step S332. Otherwise, the selected partial layout already has an equal or worse penalty score than the current final layout. Accordingly, the operation continues to step S328.

In step S328, the final layout is output. Operation of the method then continues to step S330, where operation of the method ends. Because the various exemplary embodiments of a method for determining a layout with the lowest penalty score according to this invention evaluate partial layouts with the lowest score first, a final layout that has a penalty score lower then the penalty score of the current partial layout must be the lowest scoring final layout.

In step S332, the row height for the next highest row for the current selected partial layout is set to the height of the smallest image size. Then, in step S334, a first or next unique block count for the next highest row is determined based on the selected partial layout. Next, in step S336, a determination is made, based on the determined first or next unique block count, whether enough unused images remain to fill the remaining rows of the layout even if the remaining rows of the layout are filled only with images of the largest possible size. If there are not enough original images remaining that have not been used in either the current partial layout or the determined block count to fill the remaining space in the layout, then the determined block count cannot result in a final layout. Therefore, operation jumps to step S340. Otherwise, operation continued to step S338.

In step S338, a determination is made whether, based on the determined first or next unique block count, the remaining layout area will be exceeded even if the remaining rows of the layout are filled only with images of the smallest image size. If the layout area will be exceeded, there is no way that the determined block count could result in a final layout because all of the remaining images cannot fit in the final layout. Accordingly, operation continues to step S340. If, however, the remaining images do fit within the layout, it is possible that the block count will result in a final layout. Accordingly, operation jumps to step S342.

In step S340, the determined first or next unique block count is discarded. Operation then returns to step S334. In contrast, in step S342, the penalty score of the first or next unique block count is determined as the lower bound of lowest scoring layout permutation of the determined block count. Operation then continues to step S344. It should again be appreciated that the new partial layout created in step S338 does not become the current selected partial layout. The determined block count and the score of that block count are associated with the current selected partial layout, creating a new partial layout.

In step S344, a determination is made whether the new partial layout fills the total area of the video summary with all of the input images. If not, operation continues to step S346. Otherwise operation jumps to step S348. In step S346, the new partial layout and the penalty score for the new partial layout are stored in a bucket corresponding to the penalty score of that new partial layout. It should be appreciated that the penalty score for the new partial layout is simply the combined penalty scores for each row of that new partial layout. It should further be appreciated that the same buckets are used that were created in step S314. If, however, there is no bucket that was created in step S314 corresponding to the penalty score for the new partial layout, a bucket corresponding to the penalty score of that new partial layout is created. Operation then jumps directly to step S360.

In contrast, in step S348 the input images are placed in the rows according to the row block counts used to determine the new partial layout score, to create a candidate final layout. Then, in step S350, the candidate final layout score is determined for the candidate final layout by comparing each image in the candidate final layout with each input image. Next, in step S352, a determination is made whether a final layout score has been previously determined. If so, operation continues to step S354. Otherwise, operation jumps directly to step S358.

In step S354, a determination is made whether the score of the previously-determined final layout is less than or equal to the score of the selected candidate final layout. If so, operation continues to step S356. Otherwise, operation again jumps directly to step S358.

In step S356, the candidate final layout is discarded. Operation then jumps to step S360. In contrast, in step S358, the candidate final layout is selected as the current final layout, thereby replacing the previous final layout. Accordingly, the candidate final layout score becomes the current final layout score. Operation then continues to step S360.

In step S360, a determination is made whether all of the first or next unique block counts for the current selected partial layout have been determined. If not, operation returns to step S330. Otherwise, operation continues to step S362, where a determination is made whether the row height for the next highest row is equal to the largest image size. If not, operation continues to step S364. Otherwise, operation jumps to step S366. In step S364, the current next highest row height is increased by the height of the smallest image. Operation then again returns to step S330. In contrast, in step S366, the current selected partial layout is again discarded. Operations then returns to step S322.

That is, if, in step S362, the row height for the current next highest row is equal to the largest image size, then all first or next block counts for the next highest row of the current selected partial layout have been considered and either become part of a new partial layout stored in the list of partial layouts or are discarded. If the row height is determined to be equal to the height of the largest image, all of the block counts for the next highest row of the current selected partial layout have been considered, and therefore every possible expansion of that layout has been considered In the first, second, and third embodiments of the method for determining the final layout according to this invention, a row that is filled with an image or block count that starts with a particular image will always receive the same penalty score, because the first image tends to determine which layout permutation will produce the lowest score. Rather than determining the score each time that count is considered, in a fourth exemplary embodiment of the method for determining the final layout according to this invention, the score is associated with the particular image or block count and start image. That score is then recalled each time the pair of image or block count and start image are considered.

Figure 24:
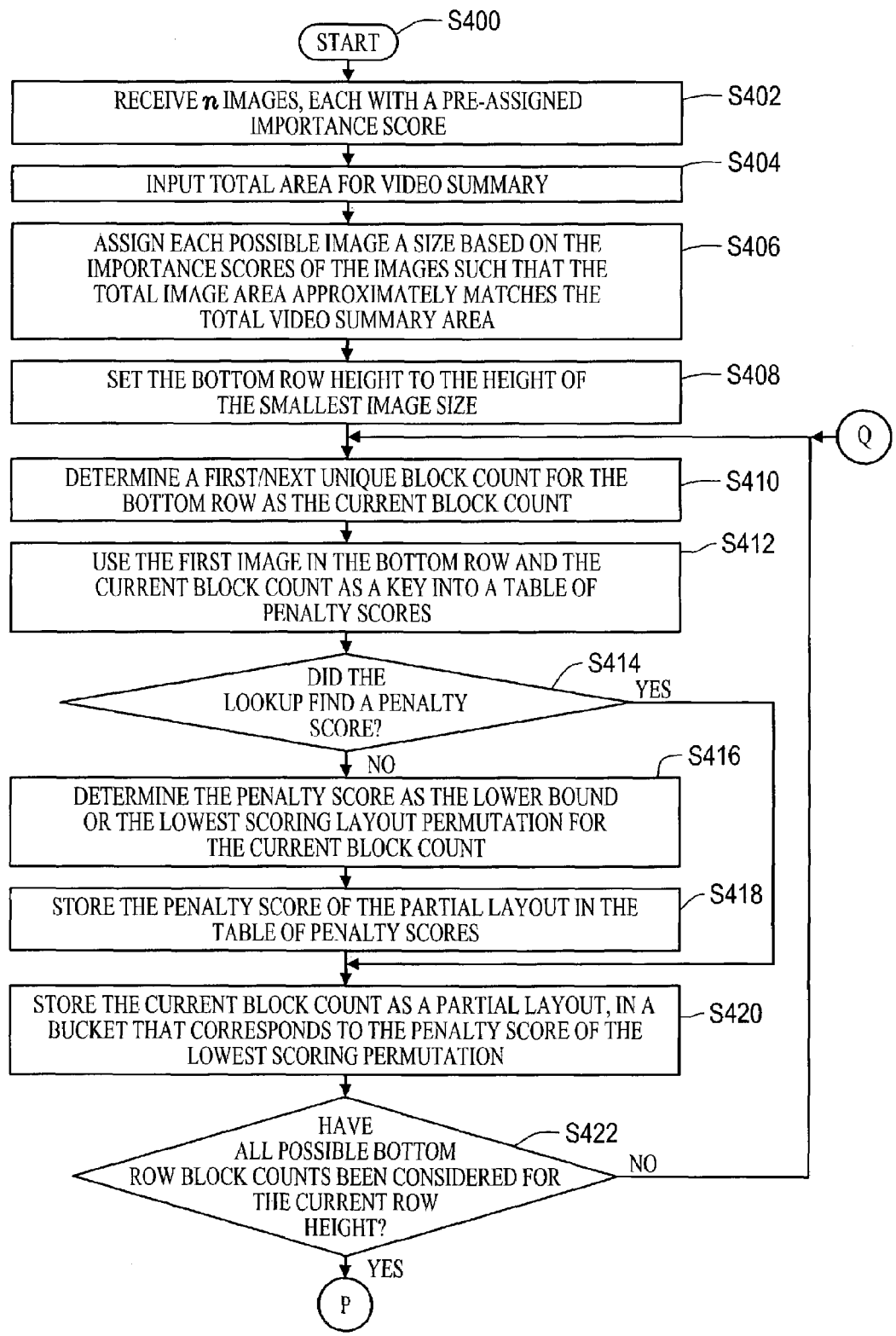
FIGS. 24-27 are a flow chart outlining the fourth exemplary embodiment of a method for determining a final layout according to this invention.
Figure 25:
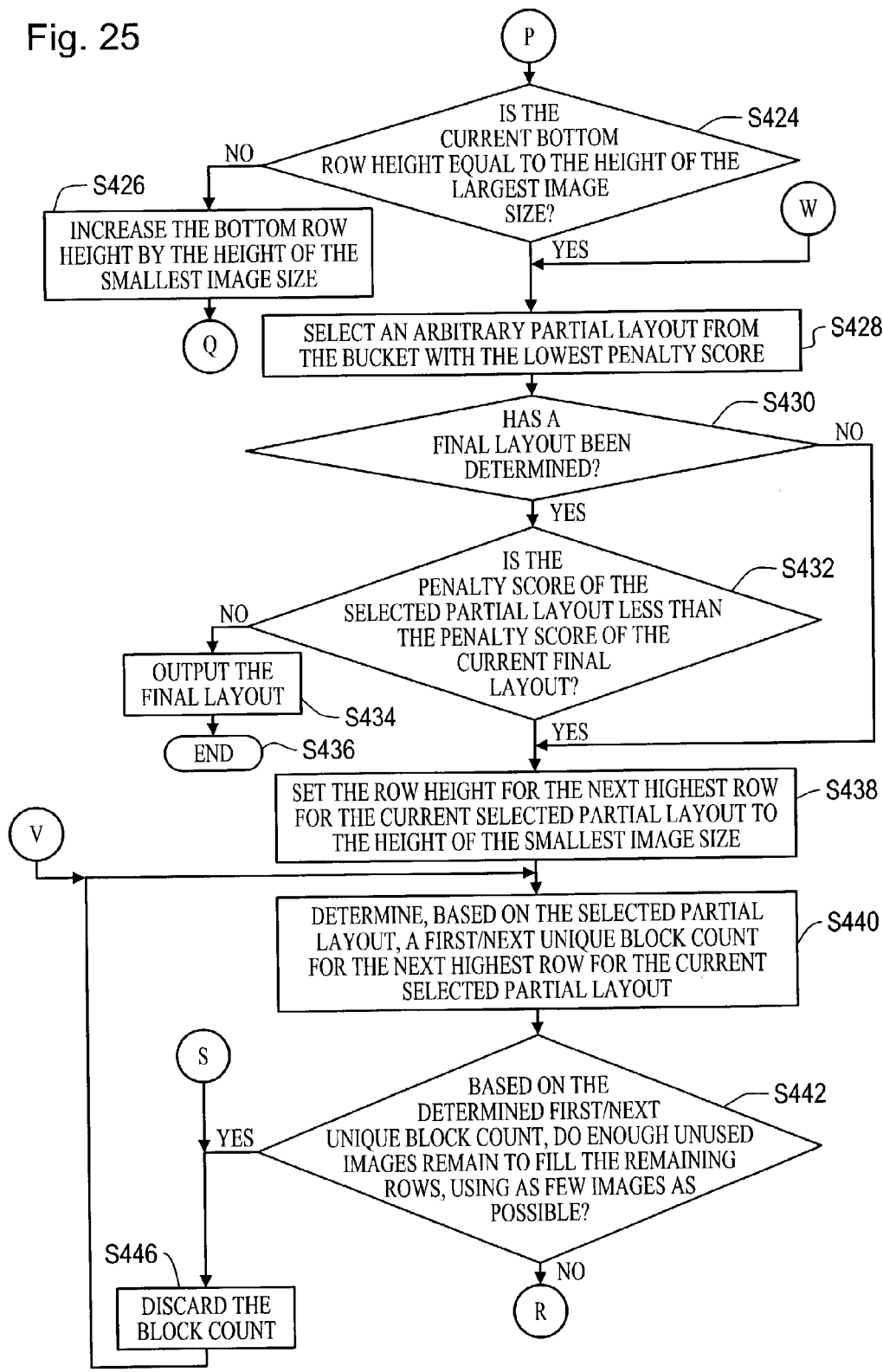
Figure 26:
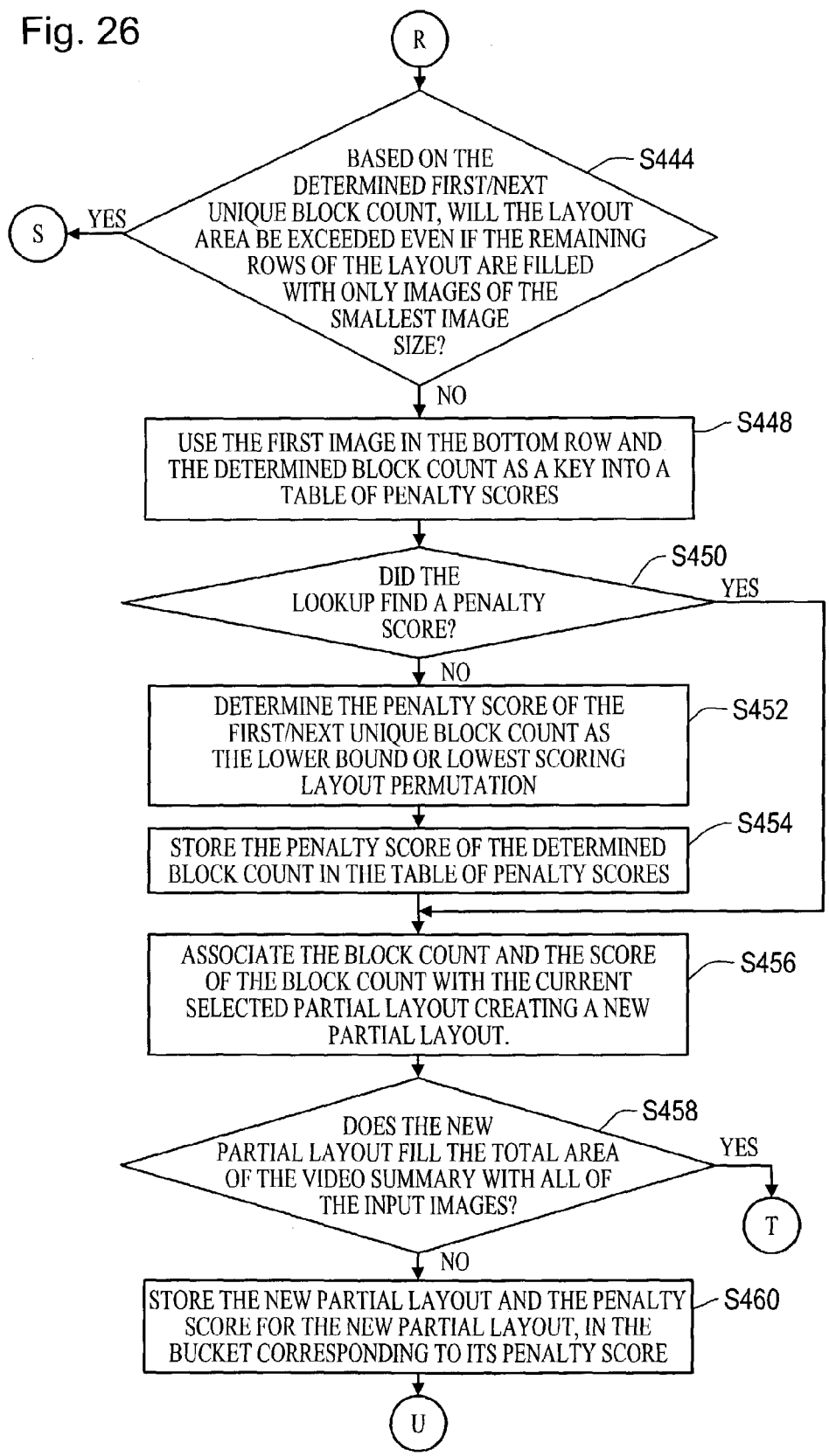
Figure 27:
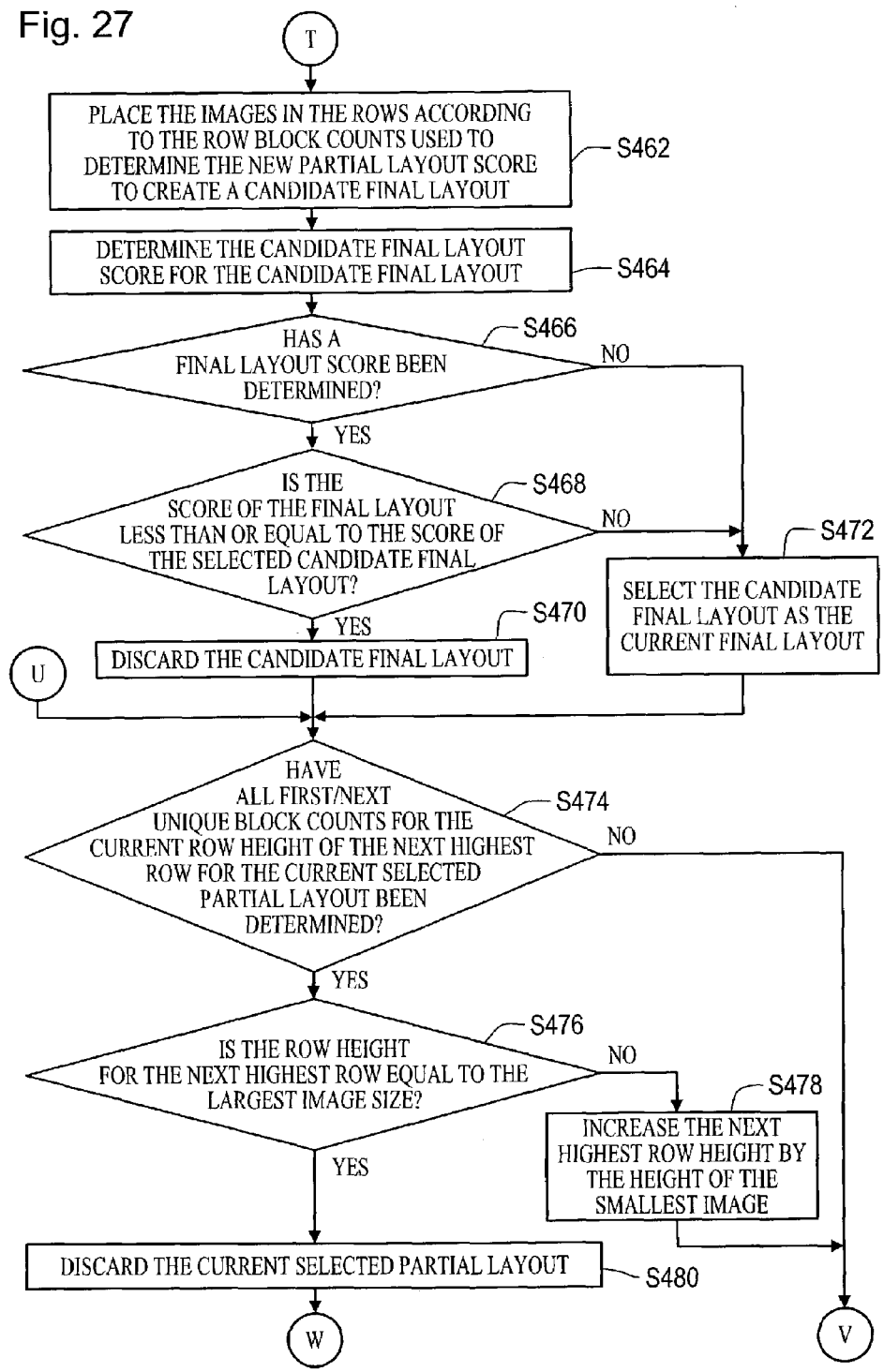

FIGS. 24-27 are a flowchart that describes the fourth exemplary embodiment of the method for determining the layout with the "lowest" penalty score. As shown in FIG. 24, operation of the method begins in step S400, and continues to step S402, where a number of images n, each having a preassigned importance score, are input. Next, in step S404, a total area for the video summary, such as for example, nine inches wide by seven inches tall, is input. Then, in step S406, image sizes are assigned relative to the importance of the input images, such that the total image area approximately matches the input total area. Operation then continues to step S408.

Any number of relative image sizes maybe input, e.g., 121-123 for three different sizes or 124-127 for four different sizes. It should be appreciated that, in general, while not strictly necessary, all images should have widths and heights that are integer multiples of the width and height of the smallest image. Again, it should be appreciated that the total area for the video summary may also be expressed in terms of the smallest image size. Thus, instead of expressing the area in inches or centimeters, the area can be expressed, for example, as nine times the width of the smallest image 121 or 124 by seven times the height of the smallest image 121 or 124.

In step S408, the height of the bottom row is set to the smallest image size. Next, in step S410, a first unique block count, or a next unique block count, for the bottom row is determined. Then, in step 412, the first image in the bottom row and the determined block count are used as a key into a table of penalty scores arranged by first image and block count. Operation then continues to step S414.

In step S414, a determination is made whether or not a penalty score exists in the list for the current first image, block count combination. If not, operation continues to step S416. If so, the computation of the score may be skipped, thereby saving the time and resources necessary to compute the score. Accordingly, operation jumps directly to step S420.

In step S416, the penalty score for each layout permutation of the determined first or next block count for the bottom row is determined. The penalty score for each layout permutation for the determined block count is determined by comparing the qualities of that layout permutation with the qualities, such as the preassigned image size, of the corresponding subset of input images. Next, in step S418, the penalty score of the partial layout is stored in the table of penalty scores. Then, in step S420, the block count and the corresponding penalty score for that block count are stored as a partial layout in a bucket that corresponds to the penalty score of the lowest scoring permutation of that block count. Operation then continues to step S422.

In step S422, a determination is made whether all bottom row block counts have been considered for the current row height. If not, operation returns to step S410. Otherwise, operation continues to step S424. In step S424, a determination is made whether the current bottom row height is equal to the height of the largest image size. If the height of the bottom row is not equal to the largest image size, then all possible bottom row block counts have not been considered. Accordingly, the operation continues to step S426. Otherwise, operation jumps to step S428. In step S426, the bottom row is increased in height by the height of the smallest image. Operation then again returns to step S410.

In contrast, in step S428, an arbitrary partial layout is selected from the bucket corresponding to the lowest penalty score. Then, in step S430, a determination is made whether a final layout score has been determined. If a final score for a full layout, as opposed to a partial layout, which is all that has been determined the first time step S430 is encountered, has not been determined, operation continues to step S432. Otherwise, operation jumps to step S438.

In step S432, a determination is made whether the selected partial layout has a penalty score that is less than the penalty score of the current previously-determined final layout. If so, the selected partial layout could result in a lower scoring final layout. Consequently, operation again jumps to step S438. Otherwise, the selected partial layout already has an equal or worse penalty score than the current final layout, and the operation continues to step S434.

In step S434, the final layout is output. Operation then continues to step S436, where the method ends. Again, because the various exemplary embodiments of a method for determining a layout with the lowest penalty score according to this invention evaluate partial layouts with the lowest score first, a final layout that has a penalty score lower then the penalty score of the current partial layout must be the lowest scoring final layout.

In step S438, the row height for the next highest row for the current selected partial layout is set to the height of the smallest image size. Then, in step S440, a first or next unique block count for the next highest row is determined based on the selected partial layout. Next, in step S442, a determination is made, based on the determined first or next unique block count, whether enough unused images remain to fill the remaining rows of the layout, even if the remaining rows of the layout are filled only with images of the largest possible size. If there are not enough of the original images remaining that have not been used in either the current partial layout or determined block count to fill the remaining space in the layout, then the determined block count cannot result in a final layout. Therefore, operation jumps to step S446. Otherwise, operation continues to step S444.

In step S444, a determination is made whether, based on the determined first or next unique block count, the remaining layout area will be exceeded even if the remaining rows of the layout are filled only with images of the smallest image size. If the layout area will be exceeded, there is no way that the determined block count could result in a final layout because all of the remaining images cannot fit in the final layout. Accordingly, operation continues to step S446. Otherwise, operation jumps to step S448. In step S446, the determined block count is discarded. Operation then returns to step S440.

In step S448, the first image in the next highest row and the determined block count for the next highest row are used as a key into a table of penalty scores arranged by first image and block count. Then, in step S450, a determination is made whether a penalty score exists in the list for the current first image and block count combination. If so, operation continues to step S452. Otherwise, operation jump directly to step S454. In step S452, the penalty score of the first or next unique block count is determined as the lower bound of lowest scoring layout permutation of the determined block count and the block count and the score of the block count are associated with the current selected partial layout, creating a new partial layout. Then, in step S454, the penalty score of the determined block count is stored in the table of penalty scores. Next in step 456, the determined block count for the next highest row and the penalty score for the determined block count for the next highest row are associated with the current selected partial layout creating a new partial layout. Operation then continues to step S458. It should be appreciated that the new partial layout created in step S456 does not become the current selected partial layout. The determined block count and the score of that block count are associated with the current selected partial layout, creating a new partial layout.

In step S458, a determination is made whether the new partial layout fills the total area of the video summary with all of the input images. If not, operation continues to step S460. Otherwise, operation jumps to step S462. In step S460, the new partial layout and the penalty score for the new partial layout are stored in a bucket corresponding to the penalty score of that new partial layout. It should be appreciated that the penalty score for the new partial layout is simply the combined penalty scores for each row of that new partial layout. It should again be appreciated that the same buckets are used that were created in step S418. If, however, there is no bucket that was created in step S418 corresponding to the penalty score for the new partial layout, a bucket corresponding to the penalty score of that new partial layout is created. Operation then jumps directly to step S474.

In contrast, in step S462, the input images are placed in the rows according to the row block counts used to determine the new partial layout score, to create a candidate final layout. Then, in step S464, the candidate final layout score is determined for the candidate final layout by comparing each image in the candidate final layout with each input image. Next, in step S466, a determination is made whether a final layout score has been previously determined. If so, operation continues to step S468. Otherwise, operation jumps directly to step S472.

In step S468, a determination is made whether the score of the previously determined final layout is less than or equal to the score of the selected candidate final layout. If so, operation continues to step S470. Otherwise, operation again jumps to step S472. In steps S470, the candidate final layout is again discarded. Operation then jumps to step S474. In contrast, in step S472, the candidate final layout is selected as the current final layout, thereby replacing the previous final layout. Accordingly, the candidate final layout score becomes the current final layout score. Operation then continues to step S474.

In step S474, a determination is made whether all first or next unique block counts for the current selected partial layout have been determined. If not, operation returns to step S440. Otherwise, operation continues to step S476, where a determination is made whether the row height for the next highest row is equal to the largest image size. If not, operation continues to step S478. Otherwise, operation jumps to step S480. In step S478, the current next highest row height is increased by the height of the smallest image. Operation then returns to step S440.

If, however, in step S476, the row height for the current next highest row is equal to the largest image size, then all first or next block counts for the next highest row of the current selected partial layout have been considered and either become part of a new partial layout stored in the list of partial layouts or are discarded. If the row height is determined to be equal to the height of the largest image, all of the block counts for the next highest row of the current selected partial layout have been considered, and therefore every possible expansion of that layout has been considered to for the next highest row. Accordingly, in this case, operation continues to step S480, where the current selected partial layout is discarded. Operation then returns to step S428.

It should be appreciated that the various exemplary embodiments of the method for determining a final layout as described herein may be employed individually, collectively, or in any combination with one another.

A second variation of the various above-outlined exemplary embodiments of the method for determining the final according layout to this invention reduces the amount of time required to arrive at an acceptable final layout by creating a quality factor that permits any of the above embodiments to output a final layout once only partial layouts remain that are unlikely to produce a much better result. The second variation, rather than comparing the penalty score of a partial layout or partial solution directly with the penalty score of a final solution, as exemplified in steps S126, S226, S326, and S436 of the method outlined in FIGS. 10-13 and 16-27, compares the penalty score of a partial layout or partial solution with the penalty score of a final solution in light of a quality factor. According to the various exemplary embodiments of the method for determining the final layout described thus far, the stored final layout would be output when there is no partial layout with a lower penalty score.

The second variation requires that a quality factor be input. For example, if the quality factor was a factor of two, the stored final layout would be output when the penalty score of the partial layout with the lowest penalty score would be no less than one half of the penalty score of the final layout. Put another way, a current or a partial layout or solution would be discarded when the penalty score of the final layout was less than or equal to twice the penalty score of that current partial layout or partial solution.

This second variation greatly reduces the time required to arrive at an acceptable final layout, because fewer partial layouts have to be completed before the score of the partial layout with the lowest score exceeds the score of the final layout. That is, the score of a given partial layout will exceed the score of the final layout, if the score of that given partial layout is going to, relatively earlier in the analysis of that layout or partial solution. As a result, the various exemplary embodiments of the method for determining the final layout do not have to determine as many rows for each partial layout or partial solution. However, in this second variation, as it is applied to various exemplary embodiments of the method for determining the final layout according to this invention, the final layout output will most likely not be the layout with the lowest possible penalty score, and therefore not the layout with the most desirable qualities. By applying the second variation, it is possible that a partial layout or solution that would have resulted in the lowest scoring final layout will not be completed before the final layout is output.

It should be appreciated that, rather than a quality factor, a time limit may be employed in the second variation. When a time limit is used, the stored final layout would be output as soon as the time limit expires or the first final layout is found, whichever comes earlier.

A third variation of the above-outlined various embodiments of the method for determining the final layout according to this invention further reduces the time required to determine a final layout by delaying the creation of partial layouts. In this third variation, rather than creating a new partial layout when the current selected partial layout is expanded to the next row, pairs of partial layouts and row configurations may be stored in buckets of partial solutions. Consequently, only when a partial solution is processed further is the object representing it actually created.

A fourth variation of the various above-outlined exemplary embodiments of the method for determining the final layout according to this invention reduces the time required to determine a final layout by reducing the number of layout permutations that will likely have to be considered for each image or block count. To avoid analyzing each permutation of a given image or block count and start image, each image count or block count is ranked by cost for each possible start image. When, according to the above-outlined various embodiments of the method for determining the final layout, a unique image count or block count for the next highest row is determined, the image count or block count with the lowest cost will be considered first and the remaining image or block counts will be considered in lowest-cost-next order. Because the least expensive block counts will be considered first, all image counts or block counts whose cost exceeds the penalty score of a previously considered layout permutation need not be considered.

In a fifth variation, which applies only in conjunction with the fourth exemplary embodiment variation, the score for actually placing images into a row is used instead of the lower bound determined by the comparison of block counts with the counts of the assigned image sizes. This is because, in the fourth exemplary embodiment, the penalty score for each layout permutation only needs to be looked up rather than re-determined each time it is considered.

A sixth variation of the various exemplary embodiments of a method for determining a final layout reduces the likelihood of shrinking important images. Importance scores are mapped onto fractional image sizes within the important image. This tends to make it more expensive to shrink important images to smaller sizes. This variation not only prevents shirking important images, but also reduces the time needed to arrive at a final layout because partial layouts that include important images that have been reduced in size will have very large penalty scores and will be discarded earlier.

Finally, a seventh variation produces summaries that do not maintain the aspect ratio of all images but place them in any rectangular area of the grid and show the center portion of that image. For example, an image of largest size 127 would not be shrunk or have its aspect ratio changed to fit within a smaller, yet relatively wider and shorter with respect to aspect ratio. Instead, the layout generating method according to the seventh variation would crop the image to fit within the desired area. This seventh variation assumes that the most important information in an image is usually near the center of the image.

Such summaries are visually more interesting because they offer more variety. Also, because more combinations of shapes are available, fewer images would have sizes that do not correspond to their importance. This seventh variation would increase the number of building blocks and thus the time required to produce a layout but otherwise does not change the layout generating method substantially.

The seventh variation could also be used for laying out user interface elements in a grid, by merely specifying the desired sizes and aspect ratios of the user interface elements. The layout generating method according to the seventh variation would fill the area of the user interface by placing the user interface elements in order and by keeping as many as possible in the desired size and aspect ratio. Laying out user interface elements in a grid is similar to the Java Grid Bag Layout technique, which is a flexible layout manager that aligns user interface elements vertically and horizontally, without requiring the elements to be of the same size. Each element occupies one or more cells.

It should be appreciated that it is equally possible for any of the above described embodiments and variations to construct a final layout by beginning with the top row and building the layout in a top-down fashion. That method, however, is less aesthetically pleasing because any empty space would occur in the top row rather than the bottom row.

Figure 28:
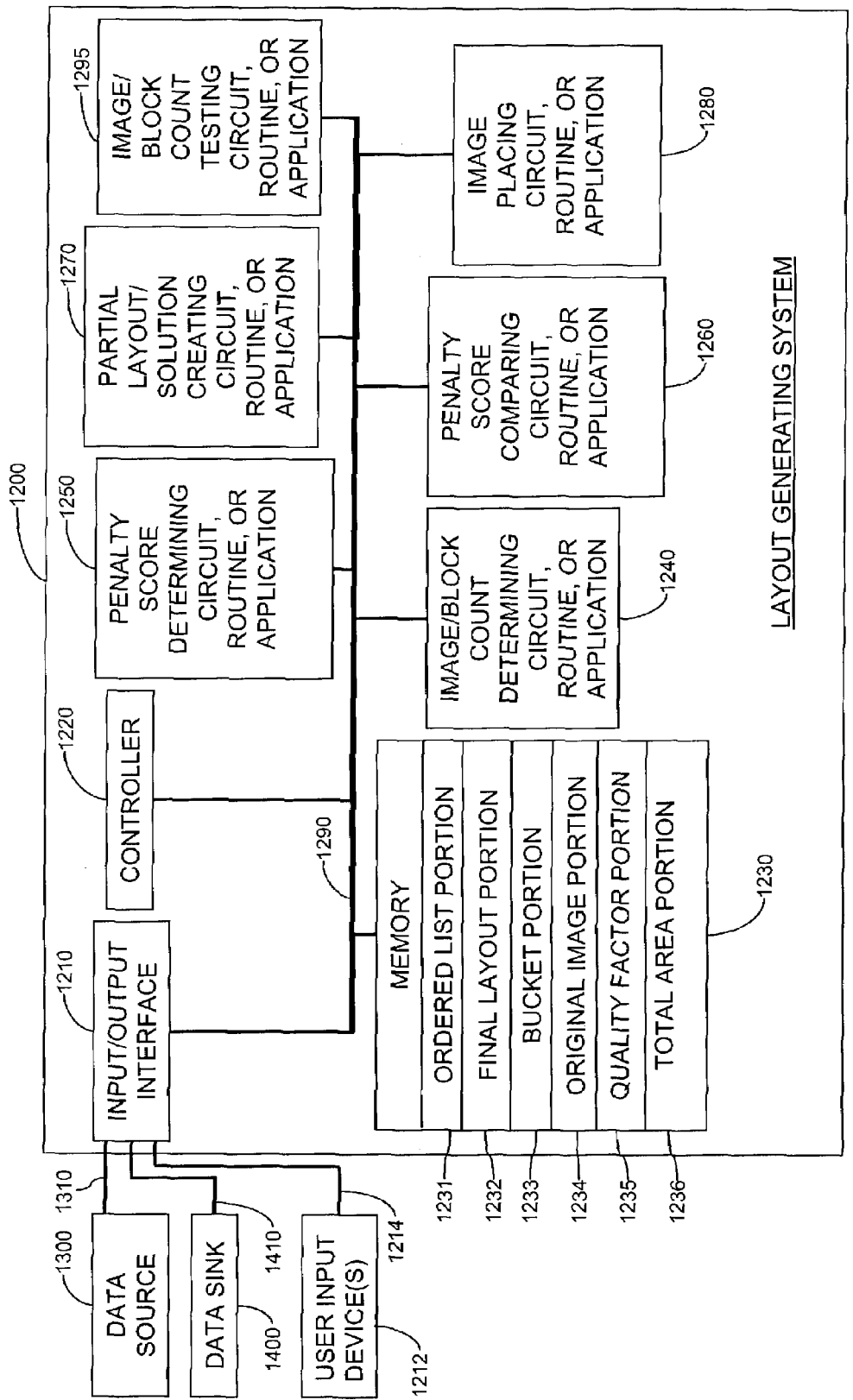
FIG. 28 is a block diagram outlining one exemplary embodiment of a layout generating system according to this invention.

FIG. 28 shows one exemplary embodiment of a layout generating system 1200 that determines an aesthetically pleasing layout for a video image summary according to this invention. As shown in FIG. 28, the layout generating system 1200 includes an input/output interface 1210, a controller 1220, a memory 1230, an image/block count determining circuit, routine or application 1240, a penalty score determining circuit, routine or application 1250, a penalty score comparing circuit, routine or application 1260, a partial layout/partial solution generating circuit, routine or application 1270, and an image placing circuit, routine or application 1280, each interconnected by one or more control and/or data busses and/or application programming interfaces 1290.

The input/output interface 1210 connects the layout generating system 1200, through links 1214, 1310, and 1410, to one or more user input device(s) 1212, a data source 1300, and a data sink 1400, respectively. The one or more user input device(s) 1212 allow information that has not been previously stored or modified, such as a total area of a layout or a quality factor, to be input by the user into the layout generating system 1200. The data source 1300 supplies previously stored or modified data, such as the original images, that will be used by the layout generating system 1200 when generating the layout for the video image summary. The final layout that is generated or modified by the layout generation system 1200 is output to the data sink 1400.

It should be appreciated that the data source 1300 can be a digital camera, a digital video camera, a scanner, or a locally or remotely located computer, the client or server of a network, or any other known or later-developed device that is capable of generation, storing, or manipulating image data. Similarly, the image data sink 1400 can be any known or later-developed device or system that is capable of receiving data output by the layout determining layout generating system 1200 and either storing, transmitting, displaying, or further modifying the data.

The links 1214, 1310, and 1410 can each be any known or later developed device or system for connecting the one or more input devices 1212, the data source 1300 and the data sink 1400, respectively, to the layout determining layout generating system 1200, including a direct cable connection, a connection over a wide area network or a local area network, a connection over an intranet, a connection over the Internet, or a connection over any other distributed processing network or system. The network can be a local area network, a wide area network, an intranet, the Internet, or any other distributed processing and/or storage network. In general, the links 1214, 1310, and 1410 can each be any known or later developed connection system or structure usable to connect one or more input devices, the data source 1300 and the data sink 1400, respectively, to the layout determining layout generating system 1200. Further, it should be appreciated that each of the links 1214, 1310, and 1410 can includes wired and/or wireless portions.

The controller 1220 directs the flow of data into, within, and out of the layout generating system through the one or more control and/or data busses and/or application programming interfaces 1290 and/or the links 1214, 1310, and 1410.

The memory 1230 includes one or more of an ordered list portion 1231, a final layout portion 1232, a bucket portion 1233, an original image portion 1234, a quality factor portion 1235, and/or a total area portion 1236. The ordered list portion 1231 stores data representing partial layouts, partial solutions, image counts, and/or block counts. The ordered list portion 1231 also stores data representing the penalty score for each of the partial layouts, partial solutions, image counts, and/or block counts stored in the ordered list portion 1231. Similarly, the bucket portion 1233, if used or implemented, stores data representing partial layouts, partial solutions, image counts, and/or block counts, and data representing the penalty score for each of the partial layouts, partial solutions, image counts, and/or block counts stored in the bucket portion 1233.

The final layout portion 1232 stores data representing a final layout that has been generated by the layout generating system 1200. The original image portion 1234 stores data representing the original images as input into the layout generating system 1200 from the data source 1300. The quality factor portion 1235 1230 stores data representing a quality factor that is input into the input/output interface 1210 either from one of the one or more user input device(s) 1212 or the data source 1300, as well as the importance assigned to each of those images and data defining the order of the images. Finally, the total area portion 1236 stores data representing the total area of the final layout that is input into the input/output interface 1210 either from one of the one or more user input device(s) 1212 or the data source 1300.

As shown in FIG. 28, the memory 1230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The image/block count determining circuit, routine or application 1240 determines image counts or block counts based on the data that is stored in the original image portion 1234 comprising the original images, the importance of the images, and/or the order of the images. The penalty score determining circuit, routine or application 1250 inputs data representing an image or block count and the data stored in the original image portion and, based on that data, generates data representing the penalty score for that image or block count.

The partial layout/solution generating circuit, routine or application 1270 generates data representing a partial layout or solution and data representing the penalty score of that partial layout or solution either by converting image or block count data to partial layout or solution data and converting the penalty score data of that image or block count to the penalty score data for the created partial layout or solution, or by combining data representing a prior partial layout or solution with data representing an image or block count, resulting in a new partial layout or solution and combining data representing the penalty score of the prior partial layout or solution with data representing the penalty score of the image or block count, resulting in a penalty score for the new partial layout or solution.

The penalty score comparing circuit, routine or application 1260 inputs data representing at least two of an image or block count, a partial layout or solution, a final partial layout, and/or a final layout, and data representing the penalty scores of those image or block counts, partial layouts or solutions, final partial layout, and/or final layout. The penalty score comparing circuit, routine or application 1260 determines the order of the data representing the at least two of an image or block count, a partial layout or solution, a final partial layout, and/or a final layout, based on the data representing the penalty score of those image or block counts, partial layouts or solutions, final partial layout, and/or final layout.

The image placing circuit, routine or application 1280 inputs data representing a final partial layout and data representing the original images and generates data representing the original images reconfigured into the video image summary layout described by that final partial layout to generate the desired video image summary. The image/block count testing circuit, routine, or application image/block count testing circuit, routine, or application 1295 inputs a partial layout or solution, and image or block count, the original images, and the total area, and determines whether, based on that image or block count, enough images remain unused to fill the remaining layout area without exceeding the total layout area.

Image data, comprising a number of original images and the other relevant information, such as the order of the original images, their relative importance and/or the number of different size images to be used, is sent from the data source 1300 through the link 1310 to the input/output interface 1210 of the layout generating system 1200. Under control of the controller 1220, the information received by the input output interface 1210 is stored in the original image portion 1234.

Data defining a total layout area is input from the one or more user input device(s) 1212 through the link 1214 to the input/output interface 1210. Under control of the controller 1220, the total layout area data is stored in the total area portion 1236 of the memory 1230. Similarly, data defining a quality factor can be input from the one or more user input device(s) 1212 through the link 1214 to the input/output interface 1210. Under control of the controller 1220, the quality factor data is stored in the quality factor portion 1235. It should be appreciated that either or both of the total layout area data and/or the quality factor data may instead be received from the image data source 1300.

The image/block count determining circuit, routine or application 1240, under the control of the controller 1220, inputs the image data, comprising the original images, the importance of the images, and the order of the images, from the original image portion 1234. Based on that data, the image/block count determining circuit, routine or application 1240 generates an image or block count. The generated image or block count is output from the image/block count determining circuit, routine or application 1240 and, under control of the controller 1220, either stored into the ordered list portion 1231 or provided directly to the penalty score determining circuit, routine or application 1250.

The penalty score determining circuit, routine or application 1250, under control of the controller 1220, inputs the generated image or block count either directly from the image/block count determining circuit, routine or application 1240 or from the ordered list portion 1231, and inputs the image data from the original image portion 1234. Then, based on that input data, the penalty score determining circuit, routine or application 1250 generates data representing a penalty score for the received image or block count. The image or block count and the generated penalty score is then output by the penalty score determining circuit, routine or application 1250 and, under control of the controller 1220, either stored into the ordered list portion 1231, or provided directly to the partial layout/partial solution generating circuit, routine or application 1270.

When, the partial layout/partial solution generating circuit, routine or application 1270 receives only an image or block count and a generated penalty score, the partial layout/partial solution generating circuit, routine or application 1270 converts the image or block count into a partial layout or solution and converts the penalty score of that image or block count into the penalty score of the newly converted partial layout or solution. Under the control of the controller, the partial layout/partial solution generating circuit, routine or application 1270 outputs the partial layout or solution data and the penalty score of the partial layout or solution data to the ordered list portion 1231.

After the partial layout or solution data and the penalty score data of that partial layout or solution is stored into the ordered list portion 1231, the controller 1220 determines, based on the image data stored in the original image portion 1234 of the memory 1230, whether the image/block count determining circuit, routine or application 1240 has generated all possible image or block counts. If the controller 1220 determines that the image/block count determining circuit, routine or application 1240 has generated all possible image or block counts, then, under the control of the controller 1220, the penalty score comparing circuit, routine or application 1260 inputs each generated partial layout and penalty score for each generated partial layout.

The penalty score comparing circuit, routine or application 1260 determines the order of the generated partial layouts or solutions based on the penalty score data of each partial layout or solution. Under the control of the controller 1220, the ordered partial layouts or solutions and the penalty scores of those ordered partial layouts or solutions are output by the penalty score comparing circuit, routine or application 1260 and stored in the ordered list portion 1231. The controller 1220 then determines whether there is any data representing a final layout stored in the final layout portion 1232 of the memory 1230.

If there is data representing a final layout in the final layout portion 1232, the penalty score comparing circuit, routine or application 1260 inputs that final layout data and the penalty score data of that final layout. The controller 1220 next determines whether there is data representing a quality factor in the quality factor portion 1235. If there is data representing a quality factor in the quality factor portion 1235, the penalty score comparing circuit, routine or application 1260 inputs that quality factor data. Then, under the control of the controller 1220, the penalty score comparing circuit, routine or application 1260 inputs the partial layout or solution data that is first in the ordered list and the penalty score data of that partial layout or solution is output from the ordered list portion 1231.

The penalty score comparing circuit, routine or application 1260 compares the penalty score data of the final layout to the penalty score data of the partial layout or solution input from the ordered list based on the quality factor. Based on the comparison, the penalty score comparing circuit, routine or application 1260 under the control of controller 1220, either outputs the partial layout or solution data and the corresponding penalty score data to the ordered list portion 1231, or outputs the final layout to the input/output interface 1210 across the link 1410 to the data sink 1400.

Following the above operation, or if the controller 1220 determines that there is no data in the final layout portion 1232, the image/block count determining circuit, routine or application 1240, under the control of the controller 1220, inputs the partial layout or solution data that is the first in the ordered list portion 1231 (i.e., has the lowest penalty score) and the image data that is in the original image portion 1234. The image/block count determining circuit, routine or application 1240, based on the input partial layout or solution data and the image data, generates an image or block count. Next, the image block count determining circuit, routine or application 1240, under the control of the controller 1220, outputs the image or block count to the image/block count testing circuit, routine, or application.

The image/block count testing circuit, routine, or application image/block count testing circuit, routine, or application 1295 inputs the original images and determines whether, based on the image or block count, enough images remain unused to fill the remaining layout area without exceeding the layout area. If enough images remain unused to fill the remaining layout area without exceeding the layout area, then the image or block count is output to the penalty score comparing circuit, routine, or application 1260. Otherwise, the image or block count is discarded, and, under the control of the controller controller 1220, another is created by the image/block count determining circuit routine or application.

The penalty score determining circuit, routine or application 1250, under control of the controller 1220, inputs the generated image or block count either directly from the image/block count determining circuit, routine or application 1240 or from the ordered list portion 1231 and inputs the image data from the original image portion 1234. Then, based on the input data, the penalty score determining circuit, routine or application 1250 generates a penalty score and associates the penalty score data with the image or block count data. The penalty score determining circuit, routine or application 1250, under the control of the controller 1220, outputs the image or block count data and the penalty score data of that image or block count to the partial solution creating circuit, routine, or application 1270.

The partial solution creating circuit, routine, or application 1270 associates the image or block count with the current partial layout or solution creating a new partial layout. Then, under the control of the controller 1220, the new partial layout is input into the image placing circuit, routine, or application 1280. The image placing circuit, routine, or application 1280 inputs the total area from the total area portion 1236 and determines whether the new partial layout fills the entire area.

If the new partial layout fills the entire area, it is output, under the control of controller 1220, to the penalty score comparing circuit, routine, or application 1260. The penalty score comparing circuit, routine, or application 1260 inputs the final layout from the final layout portion 1232 and the quality factor from the quality factor portion 1235 and compares the score of the new partial layout and the final layout in light of the quality factor. Depending on the comparison, either the final layout is returned to the final layout portion 1232 and the new partial layout is discarded or the partial final layout is output to the final layout portion final layout portion 1232, becoming the new final layout, and the final layout is discarded.

If, however, the image placing circuit, routine, or application 1280 determines that the new partial layout does not fill the total area it is output to the ordered list portion ordered list portion 1231.

After the new partial layout is output to the ordered list portion 1231, the image/block count determining circuit, routine, or application 1240 generates another image or block count based on the selected lowest scoring partial layout or solution stored in the ordered list portion 1231.

The layout generating system will continue, under the control of controller 1220, to generate and either store, or discard, new partial layouts based on the selected lowest scoring partial layout or solution until the controller 1220 determines that the image/block count determining circuit, routine, or application 1240 has determined all possible image or block counts for the selected lowest scoring partial layout or solution stored in the ordered list portion 1231. Then, under the control of controller 1220, the lowest scoring partial layout or solution is discarded and the layout generating system, under the control of controller 1220, will begin to test the next lowest scoring partial layout or solution stored in the ordered list portion 1231.

It should be understood that each of the circuits routine or applications shown in FIG. 28 can be implemented as portions of a suitably programmed general purpose computer. Alternatively, each of the circuits, routines or applications shown in FIG. 28 can be implemented as physically distinct hardware circuits within an ASIC, or using a FPGA, a PLD, a PLA or a PAL, or using discrete logic elements or discrete circuit elements. The particular form each of the circuits shown in FIG. 28 will take is a design choice and will be obvious and predicable to those skilled in the art.

It should further be appreciated that the exemplary embodiment of a system for determining a final layout shown in FIG. 28, while described above as using an ordered list portion 1231 of the memory 1230 for storing partial layouts, and image or block counts, may also use the bucket portion 1233 of the memory 1230 consistent with the third and fourth exemplary embodiments of a method for determining a final layout, as described herein.

While particular exemplary embodiments of systems and methods according to this invention have been described herein, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for creating a layout comprising:
   (a) inputting a smallest rectangular shape;
   (b) inputting a total area for the layout as integer multiples of the width and height of the smallest rectangular shape;
   (c) inputting a largest acceptable rectangular shape as integer multiples of the width and height of the smallest rectangular shape;
   (d) inputting a plurality of rectangular shapes, wherein each of the plurality of rectangular shapes is characterized by a size relative to the smallest rectangular shape and no larger than the input largest acceptable rectangular shape;
   (e) determining if a selection of said plurality of rectangular shapes exists such that the selection has the cardinality of the input plurality of rectangular shapes and the plurality of rectangular shapes covers the inputted total area without overlapping or leaving any part of the total area uncovered, wherein:
      (1) if at least one such plurality of rectangular shapes exists, producing a layout of the plurality of inputted shapes by changing the sizes of some of the inputted rectangular shapes sizes relative to a smallest rectangular shape and no larger than the input largest acceptable rectangular shape such that the plurality of rectangular shapes covers the input total area without overlapping; and
      (2) if no such plurality of rectangular shapes exists, find a total area similar to the inputted total area for which such a combination exists and apply the layout method to that total area.

2. The method of claim 1, further comprising organizing the total area into rows of varying heights and placing the rectangular shapes into the rows such that at least one of the rectangular shapes in a row has the same height as the row.

3. The method of claim 2, wherein the width and height of all placed rectangular shapes are integer multiples of the width and height of the smallest rectangular shape.

4. The method of claim 3, further comprising:
   (a) determining a penalty score for changing the size of an input rectangular shape;
   (b) combining the penalty scores of resized rectangular shapes;
   (c) determining the layout with a lowest combined penalty score.

5. The method of claim 4, further comprising:
   (a) leaving at least a part of a bottom row empty;
   (b) determining a penalty score for the empty area;
   (c) combining the penalty score for the empty area with the penalty score for the resized shapes.

6. The method of claim 5, further comprising:
   (a) determining penalty scores for properties such as the number of the rectangular shapes of the same size next to each other;
   (b) combining such penalty scores with the penalty score for the resized rectangular shapes and empty areas.

7. The method of claim 6, wherein at least one of the rectangular shapes are user interface components.

8. The method of claim 6, wherein at least one of the rectangular shapes are images.

9. The method of claim 8, wherein the inputted image sizes are based on the importance of the images.

10. The method of claim 9, wherein all inputted images have the same aspect ratio between width and height.

11. The method of claim 10, wherein at least one of the placed images preserves the aspect ratio.

12. The method of claim 11, further comprising displaying a portion of the at least one images, wherein the at least one placed images does not preserve the aspect ratio.

13. A method for creating a summary layout comprising:
    (a) inputting a plurality of rectangular shapes;
    (b) inputting a total area for the summary layout;
    (c) determining each of at least one layout of rectangular shape placeholders for a row of the summary layout as new partial layouts;
    (d) determining penalty scores for each of the at least one layout;
    (e) selecting the layout having lowest penalty score;
    (f) repeating step (c) to (e) until no rows remain;
    assigning each of the plurality of rectangular shapes to a corresponding rectangular shape placeholder and determining whether the plurality of rectangular shapes covers the inputted total area without overlapping or leaving any part of the total area uncovered.

14. The method of claim 13, further comprising:
    (a) selecting an unselected partial layout with the lowest penalty score as the current partial layout;
    (b) determining whether each of the plurality of input rectangular shapes is represented by a rectangular shapes place holder within the current partial layout, if so, terminating this step; otherwise performing the steps wherein:
       (1) if each of the input rectangular shapes is not represented by a rectangular shapes place holder:
          (i) determining, based on the current partial layout, at least one layout for a next row of the current partial layout;
          (ii) determining a penalty score for each of the at least one layout for the next row;
          (iv) combining each layout for the next row with the current partial layout to create new partial layouts; and
          (v) combining the penalty score for the current partial layout with the penalty score for each layout for the next row into the penalty scores for the new partial layouts.

15. The method of claim 14, further comprising repeating the steps of claim 14 until no unselected partial layout remains and then outputting the stored final layout.

16. The method of claim 15, wherein, if each of the input rectangular shapes is represented by a rectangular shape place holder, further comprising testing whether the rows exactly fill the total area.

17. The method of claim 16, further comprising:
    (a) converting the selected partial layout into a final layout; and (b) converting the penalty score of the selected partial layout into the penalty score of the final layout.

18. The method of claim 17, further comprising:
   (a) selecting a next unselected partial layout having a lowest penalty score from the remaining unselected at least one partial layout; and
   (b) comparing the penalty score of the selected partial layout with the penalty score of the final layout, wherein:
      (1) if the penalty score of the final layout is not greater than the penalty score of the selected partial layout:
         (i) converting the final layout into a summary layout; and
         (ii), outputting the final layout and stopping; and
      (2) if the penalty score of the final layout is greater than the penalty score of the selected partial layout:
         (i) determining, based on the selected partial layout, at least one layout for the next row of the selected layout;
         (ii) determining a penalty score for each of the at least one layout for the next row of the selected partial layout;
         (iv) combining the selected partial layout score and each layout for the next row for the partial selected layout into new partial layouts; and
         (v) combining the penalty score of the selected partial layout and the penalty score of each next row into the penalty scores for the new partial layouts.

19. The method of claim 18, wherein, if each of the input rectangular shapes is represented by a rectangular shape place holder, further comprising:
   (a) converting the current partial layout into a new final layout; and
   (b) converting the penalty score of the current partial layout into the penalty score of the new final layout;
   (c) comparing the penalty score of the new final layout with a penalty score of the stored final layout, wherein:
      (1) if the penalty score of the stored final layout is not greater than the penalty score of the new final layout, discarding the new final layout; and
      (2) if the penalty score of the stored final layout is greater than the penalty score of the new final layout;
         (i) discarding the stored final layout;
         (ii) storing the new final layout.

20. The method of claim 19, wherein at least one of the rectangular shapes are user interface components.

21. The method of claim 19, wherein at least one of the rectangular shapes are images.

22. The method of claim 21, wherein the inputted image sizes are based on the importance of the images.

23. The method of claim 22, wherein all inputted images have the same aspect ratio between width and height.

24. The method of claim 23, wherein at least one of the placed images preserves the aspect ratio.

25. The method of claim 23, further comprising displaying a portion of the at least one images, wherein the at least one placed images does not preserve the aspect ratio.

26. The method of claim 13, further comprising inputting a penalty factor.

27. The method of claim 26, farther comprising:
   (a) selecting the unselected partial layout with a lowest penalty score as the current partial layout;
   (b) determining whether each of the plurality of input rectangular shapes is represented by a rectangular shape place holder within the current partial layout, if so, terminating this step; otherwise performing the steps wherein:
      (1) if each of the input rectangular shapes is not represented by a rectangular shapes place holder:
         (i) determining, based on the current partial layout, at least one layout for a next row of the current partial layout;
         (ii) determining a penalty score for each of the at least one layout for the next row;
         (iv) combining each layout for the next row with the current partial layout to create new partial layouts; and
         (v) combining the penalty score for the current partial layout with the penalty score for each layout for the next row into the penalty scores for the new partial layouts.

28. The method of claim 27, further comprising repeating the steps of claim 14 until no unselected partial layout remains and then outputting the stored final layout.

29. The method of claim 28, wherein, if each of the rectangular shapes is represented by a rectangular shape place holder, further comprising testing whether the rows exactly fill the total area.

30. The method of claim 29, further comprising:
   (a) converting the selected partial layout into a final layout; and
   (b) converting the penalty score of the selected partial layout into the penalty score of the final layout.

31. The method of claim 30, further comprising:
   (a) selecting a next unselected partial layout having a lowest penalty score from the remaining unselected at least one partial layout; and
   (b) comparing the penalty score of the selected partial layout with the penalty score of the final layout, wherein:
      (1) if the penalty score of the final layout multiplied by the penalty factor is not greater than the penalty score of the selected partial layout:
         (i) converting the final layout into a summary layout; and
         (ii), outputting the final layout and stopping; and
      (2) if the penalty score of the final layout multiplied by the penalty factor is greater than the penalty score of the selected partial layout:
         (i) determining, based on the selected partial layout, at least one layout for the next row of the selected layout;
         (ii) determining a penalty score for each of the at least one layout for the next row of the selected partial layout;
         (iv) combining the selected partial layout score and each layout for the next row for the partial selected layout into new partial layouts; and
         (v) combining the penalty score of the selected partial layout and the penalty score of each next row into the penalty scores for the new partial layouts.

32. The method of claim 31, wherein, if each of the input rectangular shapes is represented by an rectangular shapes place holder, further comprising:
   (a) converting the current partial layout into a new final layout; and
   (b) converting the penalty score of the current partial layout into the penalty score of the new final layout.

(c) comparing the penalty score of the new final layout with the penalty score of the stored final layout, wherein:
   (1) if the penalty score of the stored final layout is not greater than the penalty score of the new final layout, discarding the new final layout; and
   (2) if the penalty score of the stored final layout is greater than the penalty score of the new final layout;
      (i) discarding the stored final layout;
      (ii) storing the new final layout.

33. The method of claim 32, wherein at least one of the rectangular shapes are images.

34. The method of claim 32, wherein at least one of the rectangular shapes are user interface components.

35. The method of claim 33, wherein the inputted image sizes are based on the importance of the images.

36. The method of claim 35, wherein all inputted images have the same aspect ratio between width and height.

37. The method of claim 36, wherein at least one of the placed images preserves the aspect ratio.

38. The method of claim 36, further comprising displaying a portion of the at least one images, wherein the at least one placed images does not preserve the aspect ratio.

39. An image summary layout determining system that generates an image summary layout for a plurality of images, comprising:
   (a) an image/block count determining circuit, routine, or application that determines at least one of image counts and block counts based on data including at least some of the images, an importance of each of the images, and an order of the images;
   (b) a penalty score determining circuit, routine, or application that inputs data representing at least one of an image count and a block count and data representing the images and generates data representing a penalty score for the input image or block count;
   (c) a penalty score comparing circuit, routine, or application that determines an order of data representing at least two of a number of image or block counts, a number of partial layouts or selected partial layouts, a final partial layout, and a final layout, based on data representing a penalty score of those image or block counts, those partial layouts or selected partial layouts, the final partial layout, and the final layout;
   (d) a partial layout/solution creating circuit, routine, or application that generates data representing a partial layout or selected partial layout and data representing the penalty score of that partial layout or selected partial layout; and
   (e) an image placing circuit, routine, or application that inputs data representing a final partial layout and data representing images and generates data representing the images reconfigured into the image summary layout.

* * * * *